(12) United States Patent
Rorro et al.

(10) Patent No.: US 11,436,543 B2
(45) Date of Patent: Sep. 6, 2022

(54) PLAN CREATION INTERFACES FOR WAREHOUSE OPERATIONS

(71) Applicant: Target Brands, Inc., Minneapolis, MN (US)

(72) Inventors: Michael Rorro, Minneapolis, MN (US); Alexander J. Meyer, Minneapolis, MN (US); Dan Goetzke, Minneapolis, MN (US); Chuong Bui, Minneapolis, MN (US); Mike Parker, Minneapolis, MN (US); Allison Ewald, Minneapolis, MN (US); Cory Norell, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 44 days.

(21) Appl. No.: 17/139,568

(22) Filed: Dec. 31, 2020

(65) Prior Publication Data
US 2022/0207452 A1 Jun. 30, 2022

(51) Int. Cl.
*G06Q 10/06* (2012.01)
*G06F 3/0482* (2013.01)
*G06Q 10/08* (2012.01)

(52) U.S. Cl.
CPC ..... *G06Q 10/06316* (2013.01); *G06F 3/0482* (2013.01); *G06Q 10/063118* (2013.01); *G06Q 10/083* (2013.01)

(58) Field of Classification Search
CPC .......... G06Q 10/00–50/00; G06F 1/00–40/00
(Continued)

(56) References Cited

U.S. PATENT DOCUMENTS 6,546,364 B1 * 4/2003 Smirnov ............ G06Q 10/0633
703/2
6,578,005 B1 * 6/2003 Lesaint ................. G06Q 10/06
705/7.14
(Continued)

FOREIGN PATENT DOCUMENTS

WO    WO 2014/008307    1/2014

OTHER PUBLICATIONS

Anvlogic.com [online], "Modeling Approaches," Mar. 30, 2018, retrieved from https://help.anylogic.com/index.jsp, 16 pages.
(Continued)

*Primary Examiner* — Alan S Miller
(74) *Attorney, Agent, or Firm* — Fish & Richardson P.C.

(57) ABSTRACT

A warehouse coordination system provides data for a plan creation user interface for a warehouse process. The warehouse coordination system receives user input that indicates a sequence of tasks to be performed over a shift for the warehouse process, user input that indicates resources to be applied to the tasks, and a simulation command to perform a simulation of the tasks. In response to receiving the simulation command, the warehouse coordination system performs the simulation of the tasks according to the user input. The warehouse coordination system provides simulation output data based on the simulation of the tasks, and receives a confirmation command to confirm the simulation output data. In response to receiving the confirmation command, the warehouse coordination system stores the user input that indicates the sequence of tasks to be performed, the user input that indicates the resources to be applied to the tasks, and the simulation output.

19 Claims, 29 Drawing Sheets

(58) Field of Classification Search
USPC .............................................. 705/7.11–7.42
See application file for complete search history.

(56) References Cited

U.S. PATENT DOCUMENTS

| | | | | |
|---|---|---|---|---|
| 6,985,872 | B2* | 1/2006 | Benbassat | G06Q 10/06311 705/320 |
| 7,254,546 | B1* | 8/2007 | Andre | G06Q 10/063116 705/7.14 |
| 7,493,591 | B2* | 2/2009 | Charisius | G06Q 10/06 717/100 |
| 8,583,467 | B1* | 11/2013 | Morris | G06Q 10/06316 705/7.22 |
| 8,626,548 | B2* | 1/2014 | Patel | G06Q 10/063116 702/158 |
| 9,092,750 | B2* | 7/2015 | Bournas | G06Q 10/063116 |
| 9,827,683 | B1* | 11/2017 | Hance | B25J 9/162 |
| 10,445,667 | B2* | 10/2019 | Hamilton | G06Q 10/063 |
| 10,643,157 | B2 | 5/2020 | De et al. | |
| 10,726,366 | B2* | 7/2020 | Banerjee | G06Q 10/063116 |
| 10,762,455 | B1* | 9/2020 | Sager | G06Q 10/067 |
| 2002/0174038 | A1* | 11/2002 | Chien | G06Q 10/087 705/28 |
| 2003/0171962 | A1 | 9/2003 | Hirth et al. | |
| 2004/0267591 | A1 | 12/2004 | Hedlund et al. | |
| 2007/0088533 | A1* | 4/2007 | Serizawa | G05B 19/41885 703/6 |
| 2007/0136079 | A1* | 6/2007 | Beykirch | G06Q 10/08 705/338 |
| 2007/0162435 | A1* | 7/2007 | Hadari | G06Q 10/087 |
| 2009/0006164 | A1 | 1/2009 | Kaiser et al. | |
| 2009/0132332 | A1* | 5/2009 | Belenky | G06Q 10/06311 705/7.13 |
| 2010/0332008 | A1* | 12/2010 | Knipfer | G09B 25/02 700/103 |
| 2011/0125539 | A1* | 5/2011 | Bollapragada | G06Q 10/043 705/7.12 |
| 2013/0297370 | A1* | 11/2013 | Pegden | G06Q 10/1097 705/7.26 |
| 2013/0325673 | A1* | 12/2013 | Abdic | G06Q 10/087 705/28 |
| 2014/0012612 | A1* | 1/2014 | Abdic | G06Q 10/04 705/7.12 |
| 2014/0122161 | A1* | 5/2014 | Gupta | G06Q 10/06316 705/7.26 |
| 2014/0136255 | A1* | 5/2014 | Grabovski | G06Q 10/063114 705/7.14 |
| 2014/0180461 | A1* | 6/2014 | Heck | G06Q 10/06311 700/97 |
| 2014/0277596 | A1* | 9/2014 | Nixon | G05B 11/01 700/17 |
| 2014/0279660 | A1 | 9/2014 | Santavicca et al. | |
| 2015/0106145 | A1* | 4/2015 | Hamilton | G06Q 10/063114 705/7.15 |
| 2015/0134382 | A1* | 5/2015 | Holm-Petersen | G06Q 10/0631 705/7.12 |
| 2018/0107961 | A1 | 4/2018 | Kiuchi et al. | |
| 2018/0293527 | A1 | 10/2018 | Amirjalayer et al. | |
| 2019/0377334 | A1* | 12/2019 | Nakamura | G06Q 10/04 |

OTHER PUBLICATIONS

Anylogic.com [online], "Simulation Software for Every Business Challenge," Mar. 30, 2018, retrieved from https://www.anylogic.com/features/, 7 pages.

Anylogic.com [online], "Supply Chain GIS (Agent-based)," Mar. 30, 2018, retrieved from https://help.anylogic.com/index.jsp, 33 pages.

Ims360.com [online], "irms 360 Cloud Warehouse Management System," Jun. 4, 2020, retrieved from https://www.ims360.com/products/ims-cloud-wms, 3 pages.

Omnna Inventory Management [online], "Overall Inventory Management", 8 pages.

Oracle.com [online[, "Task Management," 2020, //docs.oracle.com/en/, 36 pages.

Oracle.com [online], "Oracle® Warehouse Management User's Guide," Dec. 2020, retrieved on Dec. 12, 2020, retrieved from URL<https://help.sap.com/http.svc/dynamicpdfcontentpreview?deliverable_id=20817165&topics=ee8abd534f22644ce10000000a%E2%80%A6>, 109 pages.

Sap.com [online], "Warehouse Management System (WMS)," Dec. 2020, retrieved on Dec. 12, 2020, retrieved from URL<https://help.sap.com/http.svc/dynamicpdfcontentpreview?deliverable_id=20817165&topics=ee8abd534f22644ce10000000a%E2%80%A6>, 109 pages.

Skulocity.com [online], "Production Planning," 2016, retrieved on Jun. 3, 2020, retrieved from www.skulocity.com/production-planning/, 6 pages.

* cited by examiner

| RAPs | Rack | Hand | Bulk | Multi |
|---|---|---|---|---|
| 0-2 hrs | 232 | 374 | 0 | 1 |
| 2-4 hrs | 87 | 199 | 12 | 0 |
| 4-6 hrs | 100 | 204 | 7 | 0 |
| 6-8 hrs | 48 | 224 | 0 | 0 |
| 8-10 hrs | 37 | 135 | 5 | 0 |
| 12-24 hrs | 39 | 365 | 9 | 2 |
| 24-36 hrs | 34 | 70 | 5 | 1 |
| 36+ hrs | 8 | 23 | 3 | 0 |
| Total | 585 | 1,594 | 41 | 4 |

PLAN CREATION INTERFACES FOR WAREHOUSE OPERATIONS

TECHNICAL FIELD

This specification generally relates to a platform that includes integrated planning, simulation, and reporting tools, for coordinating warehouse operations, such as processes for distributing physical items from a warehouse to a store.

BACKGROUND

Warehouse management systems (WMS) can perform a variety of operations to manage the physical distribution of goods in and out of warehouses. For example, a WMS can receive orders to be distributed from a warehouse and can translate those orders into specific warehouse operations, such as selecting particular pallets from locations in the warehouse and loading them onto trucks for distribution. WMS systems have traditionally been designed to focus on processing orders within the warehouse. For example, a WMS may simply identify operations that are needed to fulfill an order and send those out to be performed by the next available resource within the warehouse (e.g., send out instructions to forklift operator).

Simulation modeling platforms have been used to facilitate simulation modeling for various business and industrial processes. Within the simulation platforms, users may develop custom models for discrete elements (e.g., processes and agents), and may define interactions between the elements. By performing simulations, for example, experiments may be conducted to determine how randomness and parameter changes affect model behavior. Simulation results may be analyzed and changes may be made based on the analysis to improve the business and industrial processes.

SUMMARY

This document generally describes computer systems, processes, program products, and devices for providing a platform that includes integrated planning, simulation, and reporting tools, for coordinating warehouse operations among multiple different groups/teams within a warehouse. For example, a warehouse may include multiple different teams who are assigned a specific set of tasks, such as a team receiving inbound shipments (e.g., unloading pallets from trucks arriving at warehouse), another team handling storage and retrieval operations (e.g., moving pallets in and around the warehouse), another team handling sortation operations (e.g., breaking apart goods on pallets and packing pallets using goods from different pallets), and another team performing shipping operations (e.g., assembling and loading outbound pallets onto trucks for distribution to retail stores). For efficiency, workers in a warehouse can be assigned to different teams to distribute the labor and operations that are performed. However, unharmonious workflow between the different teams in the warehouse can create inefficiencies because the operations that are performed among teams within a warehouse are linked to each other. For example, a receiving team working too quickly to unload inbound trucks to a warehouse can create a backlog of pallets in the dock area of the warehouse, which then makes the operations performed by a storage and retrieval team and/or a shipping team less efficient. Similarly, under-utilized labor on the receiving team can degrade the productivity of the storage and retrieval team and/or the sortation team even though those teams may have the capacity to work at a faster pace.

The disclosed technology provides solutions to these problems by generating plans that provide for harmonious coordination among teams within a warehouse that take into account relationships among teams to provide for improved efficiency for the warehouse and its teams as a whole, instead of simply for each team individually. For example, the disclosed technology provides a warehouse operation coordination platform that includes labor and production planning tools for generating and simulating detailed work plans at the team level (e.g., receiving, storage and retrieval, sortation, and shipping), and performance monitoring tools for monitoring various performance metrics (e.g., productivity, throughput, safety, etc.), across multiple teams to provide for a more efficient overall operation with coordination among the multiple teams. For instance, the disclosed technology can generate plans for each team, including the allocation of workers among the teams, that are easy to follow and that provide for synchronization among the multiple teams so that one team is not working too far ahead of or behind of other teams and thus injecting inefficiencies into the system. The end result is a plan that, when followed by each team, provides an efficient and balanced outcome for the warehouse as a whole (e.g., maximize throughput of pallets through warehouse) even though it may require one or more team to work at a pace that is below their maximum output.

The disclosed planning tools can additionally provide for and facilitate the generation of harmonious and optimized warehousing plans among multiple different warehouse teams while minimizing the complexity of the planning process by, for example, reducing the number of potential options and variations to be considered. Given the multitude of tasks, worker arrangements, and team arrangements within a warehouse, planning becomes a computationally complex problem (e.g., np-complete problem) because the sheer number of possible options to consider is virtually limitless. To avoid subjecting planners to considering a large number of options, which would inject significant inefficiency into the planning process, the disclosed technology is able to guide team leaders to quickly generate and simulate plans for their portion of the warehouse, while at the same time ensuring a harmonious and optimized overall plan for the warehouse among multiple different teams/groups.

For example, planning tools can minimize the number of options to be considered by linking plans among the teams to each other, and imposing a planning sequence among the teams so that each team's plan flows into the other teams' plans. Within the planning for each team, a variety of inputs and actions can be prompted for the user to consider and select, such as identifying blocked aisles, creating a sequence for work to be performed during a shift, applying labor assumptions to that work, applying staffing to that work, simulating the performance, iteratively applying any modifications to the plan, and then uploading the plan. Planning tools can includes a variety of features to help guide the user through the planning process, including providing guidance on the historical performance of a particular team that is being planned for, current warehousing loads, information from other teams that impact the team that is being planned for, and alerts to identify deficiencies or other problems with a proposed plan.

In some implementations, a method performed by data processing apparatuses includes providing, by a warehouse coordination system, data for a plan creation user interface for a warehouse process; receiving, by the warehouse coordination system and through a sequencing portion of the plan creation user interface, user input that indicates a sequence of tasks to be performed over a shift for the warehouse process; receiving, by the warehouse coordination system and through a resource allocation portion of the plan creation user interface, user input that indicates resources to be applied to the tasks to be performed over the shift for the warehouse process; receiving, by the warehouse coordination system and through the plan creation user interface, a simulation command to perform a simulation of the tasks to be performed over the shift for the warehouse process; in response to receiving the simulation command, performing, by the warehouse coordination system, a simulation of the tasks to be performed over the shift for the warehouse process, according to the user input that indicates the sequence of tasks to be performed and the user input that indicates the resources to be applied to the tasks; providing, by the warehouse coordination system, simulation output data based on the simulation of the tasks to be performed, for presentation by a simulation output portion of the plan creation user interface; receiving, by the warehouse coordination system and through the plan creation user interface, a confirmation command to confirm the simulation output data; and in response to receiving the confirmation command, storing, by the warehouse coordination system, the user input that indicates the sequence of tasks to be performed, the user input that indicates the resources to be applied to the tasks, and the simulation output data based on the simulation of the tasks to be performed.

Other implementations of this aspect include corresponding computer systems, and include corresponding apparatus and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other implementations can include any, all, or none of the following features. The warehouse coordination system can receive through a configuration portion of the plan creation user interface, user input that indicates a configuration of a warehouse environment in which the warehouse process is to be performed. In response to receiving the simulation command, the warehouse coordination system can perform the simulation of the tasks to be performed over the shift for the warehouse process, according to the user input that indicates the configuration of the warehouse environment. The sequencing portion of the plan creation user interface can include a list of tasks that are available to be performed over the shift for the warehouse process, and one or more controls for selecting and sequencing the tasks. The resource allocation portion of the plan creation user interface can include, for each of multiple periods of the shift for the warehouse process, one or more controls for indicating a number of workers to be staffed during the period. The warehouse coordination system can provide at least a portion of the simulation output data for use by a different plan creation user interface for a different warehouse process. The portion of the simulation output data can include a list of tasks that are available to be performed over the shift for the different warehouse process.

The warehouse coordination system can provide simulation output data corresponding to a receiving process for use by a storage plan creation user interface for a storage process. The warehouse coordination system can provide simulation output data corresponding to a retrieval process for use by a sortation plan creation user interface for a sortation process, or for use by a shipping plan creation user interface for a shipping process. The warehouse coordination system can provide simulation output data corresponding to a sortation process for use by a shipping plan creation user interface for a shipping process.

The systems, devices, program products, and processes described throughout this document can, in some instances, provide one or more of the following advantages. Data from warehouse management systems (WMS) and performance tracking systems can be ingested, enhanced, and stored, such that processes for generating work plans can execute without burdening the WMS and performance tracking systems, conserving system resources. A workflow can be provided that deepens understanding of both operations and planning processes, providing transparency to plan details while automating manual data sourcing and input. Feasible and integrated work plans can be efficiently generated. Planning simulation tools can be used to test process improvement and/or physical layout changes in a warehouse before the changes are implemented, facilitating process and layout improvements. Work plans can be based on a low level of available detail to produce a high level of output precision. Work plans for multiple different teams can be coordinated with a shared set of priorities among the teams, increasing production efficiencies throughout a warehouse. Planning processes can be standardized across warehouses that have similar operational structures. A consistent user experience can be delivered through a standardized set of tools, increasing collaboration between teams during a common planning process, and improving in-depth understanding of holistic operations by managers and higher-level leadership.

Other features, aspects and potential advantages will be apparent from the accompanying description and figures.

DESCRIPTION OF DRAWINGS

FIGS. 6A-F depict example receiving plan creation user interfaces.

FIGS. 7A-K depict example storage and retrieval plan creation user interfaces.

FIGS. 8A-D depict example shipping plan creation user interfaces.

DETAILED DESCRIPTION

This document describes technology that can coordinate warehouse operations through the use of integrated planning, simulation, and reporting tools. In general, warehouse operations managers (e.g., leaders of various warehouse teams, such as receiving, storage and retrieval, sortation, and shipping teams) may lack specific tools for creating detailed production plans and for monitoring holistic warehouse performance. For example, using manual techniques and/or ad hoc tools, a warehouse operations manager may spend several hours over the course of a shift collecting and organizing data from multiple different sources to create a production plan for their team and track team performance according to the plan. Further, a production plan created for a team through manual data aggregation and production planning techniques may be difficult to coordinate with production plans created for other teams. For example, a receiving team may be responsible for receiving goods delivered to a warehouse (e.g., unloading cartons from a truck), and a storage and retrieval team may be responsible for storing those goods in the warehouse (e.g., delivering cartons to specific warehouse locations). If production plans for the receiving team and the storage and retrieval team are independently created, for example, a production plan for the receiving team may specify that the team is to receive more goods than the storage and retrieval team is capable of storing, resulting in production inefficiencies throughout the warehouse.

The warehouse operation coordination platform described in this document includes labor and production planning tools for generating detailed work plans for warehouses at the team level (e.g., receiving, storage and retrieval, sortation, and shipping), across multiple teams. The platform also includes reporting tools for providing real-time information about work progress with respect to the generated plans, such that work across the various teams can be better coordinated, and production staffing needs can be shifted when appropriate. At a high level, the platform has three main components: a data ingestion component that receives relevant data from warehouse management systems (WMS) and performance tracking systems used to generate the work plans, a plan creation tool through which operation managers can generate and simulate plans for their portion of the warehouse, and a performance monitoring tool that provides work progress information to each of the operation managers to promote collaboration between the teams.

Figure 1A:
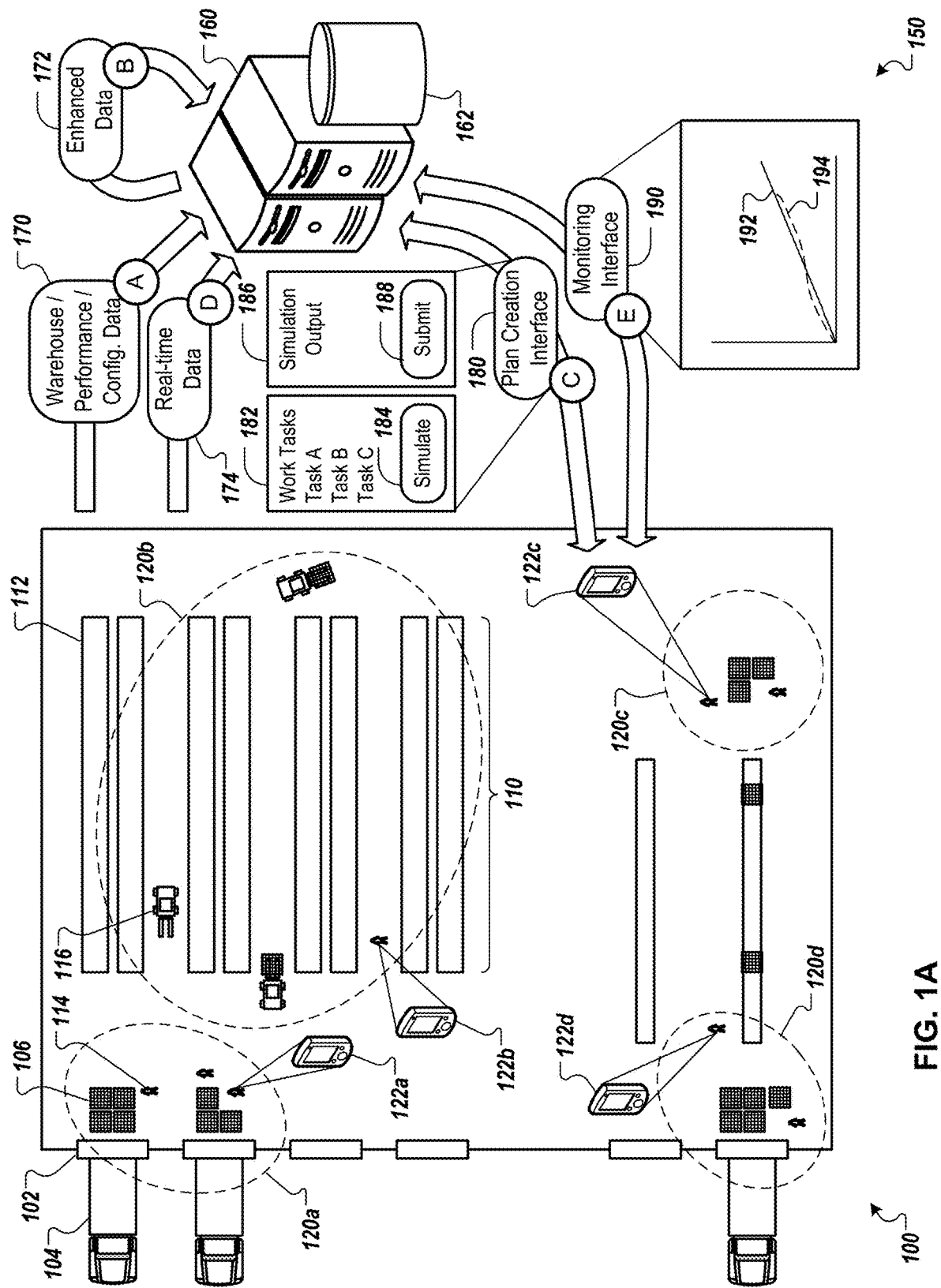
FIG. 1A is a conceptual drawing of an example warehouse environment, and an example system for generating warehouse process plans and coordinating warehouse operations.

FIG. 1A is a conceptual diagram of an example warehouse environment 100, and an example system 150 for generating warehouse process plans and coordinating warehouse operations, as represented in example stages (A) to (E). Stages (A) to (E) may occur in the illustrated sequence, or they may occur in a sequence that is different than in the illustrated sequence, and/or two or more stages (A) to (E) may be concurrent. In some examples, one or more stages (A) to (E) may be repeated multiple times during a warehouse shift.

The warehouse environment 100 can be a storage warehouse, a packing warehouse, a retail warehouse, a distribution center, or another sort of warehouse or facility, for example. In the present example, the warehouse environment 100 includes multiple docks 102 at which vehicles 104 (e.g., trucks) can be loaded and/or unloaded with various containers 106 (e.g., pallets, boxes, etc., containing various goods). The warehouse environment 100 in the present example also includes a storage area 110, which can include various storage racks 112 which can be arranged in rows and/or columns and configured to store the containers 106 in different levels. For example, elevators and/or rack conveyor belts may be used to elevate the containers 106 to different levels and move them to and from desired locations in the storage racks 112. Various workers 114 and equipment 116 (e.g., forklifts, pallet jacks, automated guided vehicles (AGVs), etc.) can be employed in the warehouse environment 100, for example, to perform various warehouse tasks.

In general, workers and equipment may be organized into different teams, each team performing a different sort of task in the warehouse environment. For example, a receiving team 120a can include workers 114 and/or equipment 116 for performing various receiving tasks, such as unloading containers 106 from vehicles 104. A storage and retrieval team 120b, for example, can include workers 114 and/or equipment 116 for performing various storage and/or retrieval tasks, such as moving the containers 106 throughout the warehouse environment 100, placing the containers 106 in the storage racks 112, and removing the containers 106 from the storage racks 112. A sortation team 120c, for example, can include workers 114 and/or equipment 116 for performing various sortation tasks, such as breaking apart containers 106 of goods and/or repackaging goods into different containers 106. A shipping team 120d, for example, can include workers 114 and/or equipment 116 for performing various shipping tasks, such as loading containers 106 into outbound vehicles 104 for transportation to other locations (e.g., warehouses, distribution centers, stores, customer locations, etc.).

In general, each team may include and/or be directed by one or more operations managers that use computer applications running on computing devices to create work plans for their team (e.g., a work plan that specifies work to be performed by the team during a shift), and to monitor the progress of the team according to the work plan (e.g., over the course of the shift). For example, an operations manager of the receiving team 120a can use computing device 122a, an operations manager of the storage and retrieval team 120b can use computing device 122b, an operations manager of the sortation team 120c can use computing device 122c, and an operations manager of the shipping team 120d can use computing device 122d. Each of the computing devices 122a-d, for example, can be various forms of stationary or mobile processing devices including, but not limited to a desktop computer, a laptop computer, a tablet computer, a personal digital assistant (PDA), a smartphone, or other processing devices.

Figure 1B:
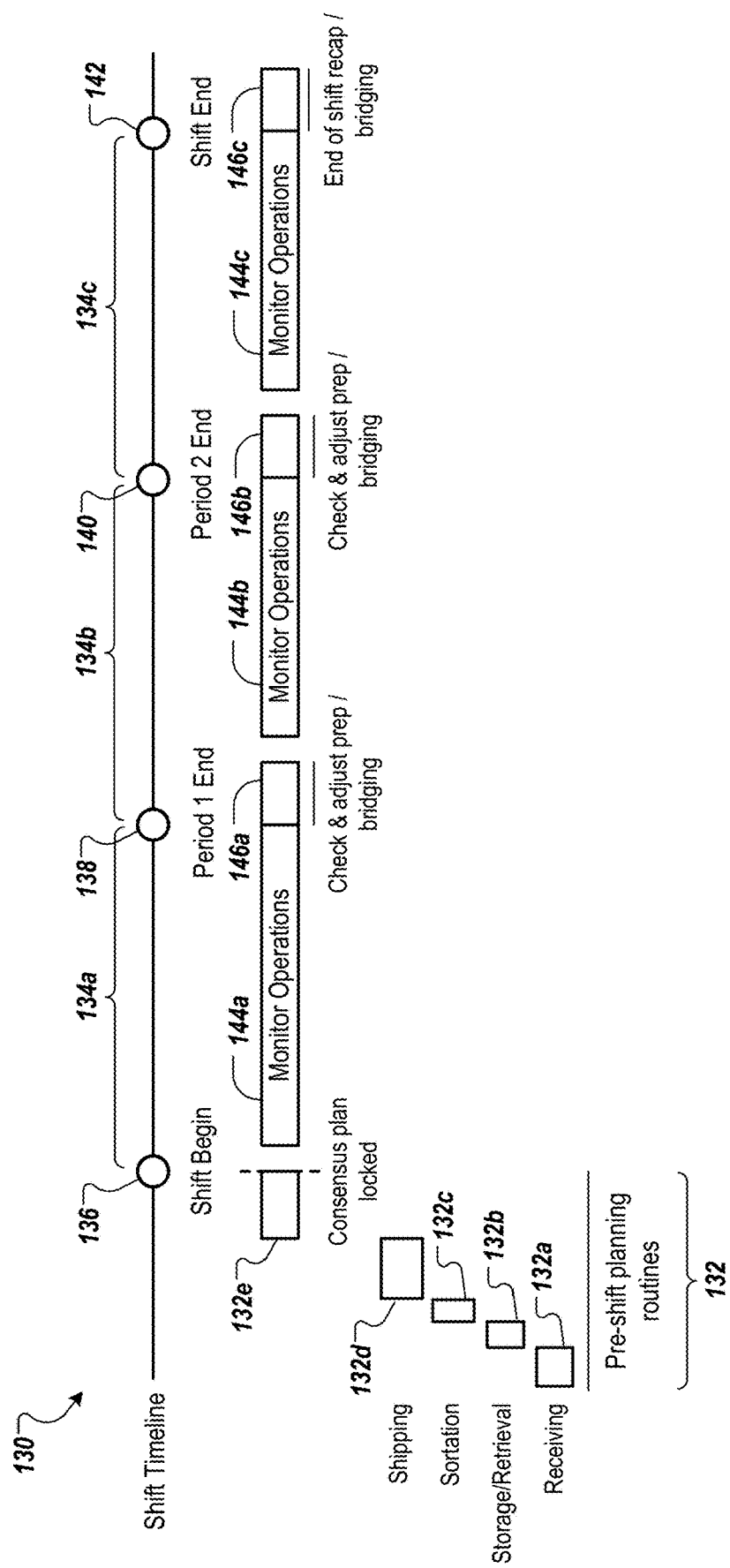
FIG. 1B shows an example shift timeline for warehouse operations.

Referring now to FIG. 1B, an example shift timeline 130 is shown for warehouse operations. A warehouse shift, for example, can be a defined time period (e.g., six hours, eight hours, twelve hours, or another suitable time period) over which various teams (e.g., teams 120a-d, shown in FIG. 1A) perform various operations in a warehouse environment (e.g., warehouse environment 100, also shown in FIG. 1A). In general, warehouse shifts may be divided into multiple different periods having defined start and end times (e.g., organized around breaks). In the present example, the shift timeline 130 includes a pre-shift period 132 during which pre-shift planning routines are performed, and multiple shift periods during which shift operations are performed. A first shift period 134a, for example, begins at time point 136 (e.g., the beginning of the warehouse shift) and ends at time point 138 (e.g., the start of the first break). A second shift period 134b, for example, begins at time point 138 and ends at time point 140 (e.g., the start of the second break). A third shift period 134*c*, for example, begins at time point 140 and ends at time point 142 (e.g., the end of the warehouse shift).

During the pre-shift period 132, for example, operations managers of various teams (e.g., teams 120*a-d*, shown in FIG. 1A) can use computing devices (e.g., computing devices 122*a-d*, also shown in FIG. 1A) to create work plans for their respective teams for the warehouse shift. In the present example, computing device 122*a* can be used during pre-shift period 132*a* to create a work plan for the receiving team 120*a*, computing device 122*b* can be used during pre-shift period 132*b* to create a work plan for the storage and retrieval team 120*b*, computing device 122*c* can be used during pre-shift period 132*c* to create a work plan for the sortation team 120*c*, and computing device 122*d* can be used during pre-shift period 132*d* to create a work plan for the shipping team 120*d*. During pre-shift period 132*e*, for example, the work plans generated during pre-shift periods 132*a-d* can be adjusted and aligned by the operations managers of the various different teams 120*a-d*, such that a consensus plan is locked when the shift begins at time point 136. Example interfaces for creating work plans are described in further detail below. In some implementations, data corresponding to a work plan for a team may be used as input for creating a work plan for another team. For example, data corresponding to a work plan for the receiving team 120*a* can be used as input for creating a work plan for the storage and retrieval team 120*b*, data corresponding to a work plan for the storage and retrieval team 120*b* can be used as input for creating a work plan for the sortation team 120*c*, and data corresponding to a work plan for the sortation team 120*c* can be used as input for creating a work plan for the shipping team 120*d*.

During the warehouse shift (e.g., during an operations monitoring period 144*a* of the first shift period 134*a*, an operations monitoring period 144*b* of the second shift period 134*b*, and an operations monitoring period 144*c* of the third shift period 134*c*), for example, operations performed by various teams (e.g., teams 120*a-d*, shown in FIG. 1A) can be monitored. In the present example, real-time data that pertains to operations performed by the receiving team 120*a* in the warehouse environment 100 (shown in FIG. 1A) can be collected (e.g., by data collection devices, such as manual input devices, scanners, cameras, or other suitable devices in the warehouse environment 100), and used to determine progress of the receiving team 120*a* relative to its work plan for the shift. Similarly, in the present example, real-time data that pertains to operations performed by each of the storage and retrieval team 120*b*, the sortation team 120*c*, and the shipping team 120*d*, can be collected and used to determine progress of the respective team relative to its corresponding work plan for the shift. In general, information related to progress relative to a work plan can be provided to each of the computing devices 122*a-d* (shown in FIG. 1A) for review by operations managers of the respective teams 120*a-d*. For example, computing device 122*a* can be used to present performance monitoring information for the receiving team 120*a*, computing device 122*b* can be used to present performance monitoring information for the storage and retrieval team 120*b*, computing device 122*c* can be used to present performance monitoring information for the sortation team 120*c*, and computing device 122*d* can be used to present performance monitoring information for the shipping team 120*d*. In some implementations, a different interface may be provided for presenting performance monitoring information for each different team. Example interfaces for presenting performance monitoring information are described in further detail below.

During and/or after the warehouse shift, for example, operations managers of various teams (e.g., teams 120*a-d*, shown in FIG. 1A) can use computing devices (e.g., computing devices 122*a-d*, also shown in FIG. 1A) to provide feedback regarding tasks being performed by their respective teams, and can adjust team resources (e.g., workers 114 and/or equipment 116, also shown in FIG. 1A) based on performance monitoring information presented by the computing devices, such that each of the various teams proceeds according to their respective plan. For example, during check & adjust period 146*a* at the end of the first shift period 134*a*, and during check & adjust period 146*b* at the end of the second shift period 134*b*, an operations manager of the receiving team 120*a*, an operations manager of the storage and retrieval team 120*b*, an operations manager of the sortation team 120*c*, and an operations manager of the shipping team 120*d* can provide team updates with respect to their various plans using their respective computing devices 122*a-d*, and can compare work progress with respect to their respective work plans. In general, team resources allocated to an overproducing team may be shifted to an underproducing team. For example, at the check & adjust period 146*a*, if the receiving team 120*a* is identified as having overproduced and the storage and retrieval team 120*b* is identified has having underproduced during the first shift period 134*a*, team resources may be shifted from the receiving team 120*a* to the storage and retrieval team 120*b*. In the present example, by re-allocating resources among teams during the shift, the production of each team 120*a-d* can better align with their respective work plan for the shift, thus improving coordination among the teams and increasing overall production throughout the warehouse environment 100. During an end of shift recap period 146*c*, for example, operations managers of the teams 120*a-d* can use performance monitoring information presented by the computing devices 122*a-d* to evaluate overall performance of the teams with respect to their plans, to identify root causes of problems that may have occurred during the shift, and to potentially improve various warehouse processes.

Referring again to FIG. 1A, for example, the system 150 for generating warehouse process plans and coordinating warehouse operations can include various computing servers 160 and data sources 162. In some examples, the computing servers 160 can represent various forms of servers, including but not limited to network servers, web servers, application servers, or other suitable computing servers. In some examples, the data sources 162 can represent databases, file systems, and/or cached data sources. The computing servers 160, for example, can access data from the data sources 162, can execute software that processes the accessed data, and can provide information based on the accessed data to the computing devices 122*a-d*. Communications between the computing servers 160, the computing devices 122*a-d*, and various data collection devices (not shown) in the warehouse environment 100, for example, can occur over one or more communication networks (not shown), including a LAN (local area network), a WAN (wide area network), and/or the Internet. In the present example, the computing servers 160 and the data sources 162 can be used to implement a warehouse coordination system, which is described in further detail with respect to FIG. 2.

Figure 2:
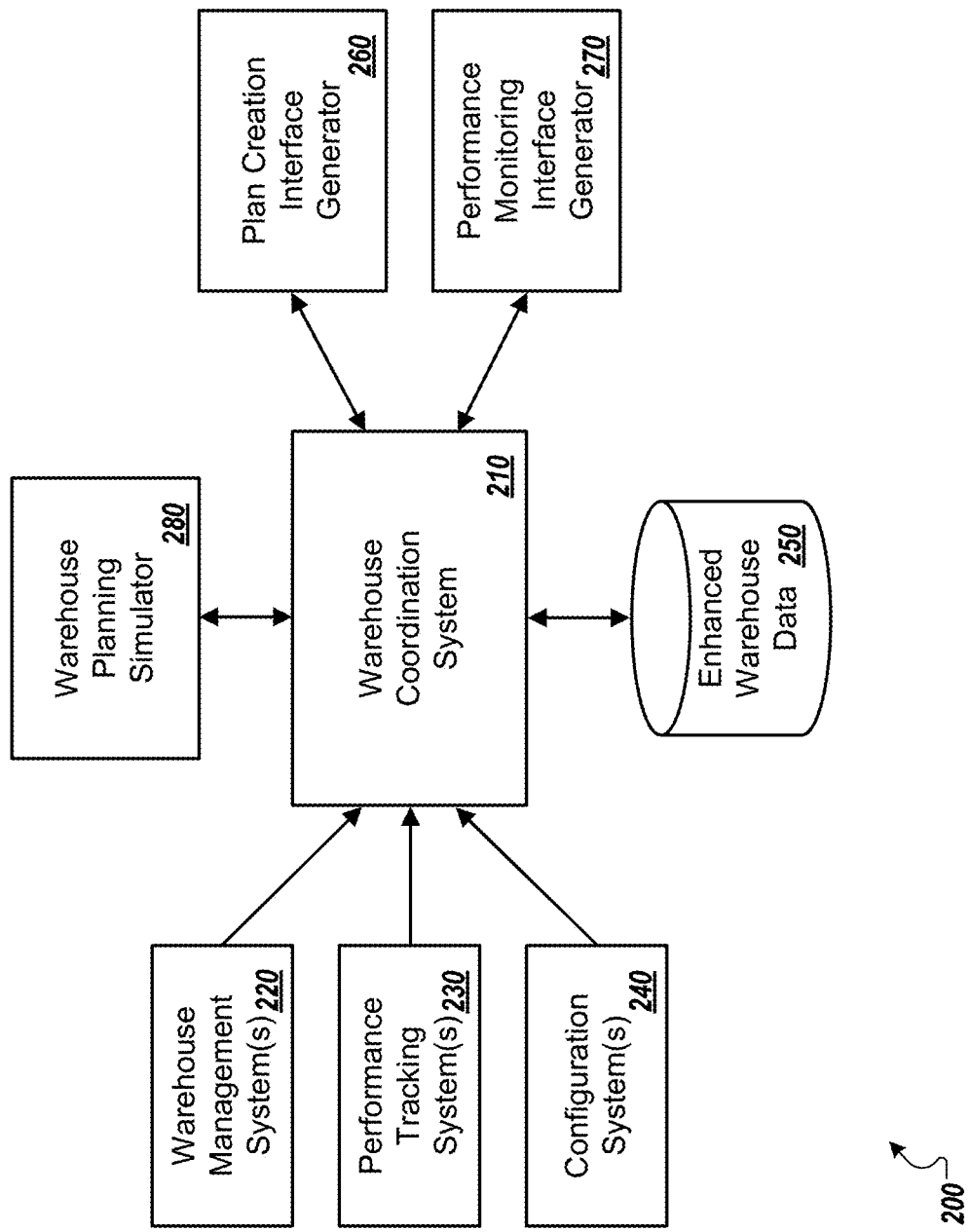
FIG. 2 depicts an example system for generating warehouse process plans and coordinating warehouse operations.

Referring now to FIG. 2, an example system 200 for generating warehouse process plans and coordinating warehouse operations is depicted. The system 200 in the present example includes a warehouse coordination system 210 that receives data (e.g., using a data collection component) from one or more warehouse management systems 220, performance tracking systems 230, and configuration systems 240. The warehouse management system(s) 220, for example, can provide real-time information related to a state of the warehouse environment 100 (shown in FIG. 1A). For example, the warehouse management system(s) 220 can provide information related to containers of goods that have been received and are waiting to be placed in the storage area 110 (shown in FIG. 1A). As another example, the warehouse management system(s) 220 can provide information related to requests for goods that are to be picked from the storage area 110 and that are to be loaded into containers 106 (shown in FIG. 1A) and sent to a retail store. As containers 106 and/or goods in the warehouse environment 100 are involved in a warehouse operation (e.g., receipt, transport, put away, pick, repackaging, shipment, etc.), for example, real-time operation data (e.g., including an operation timestamp and various identifiers related to the operation, such as location, worker, team, equipment, container, and/or goods identifiers), can be collected and stored by the warehouse management system(s) 220. The performance tracking system(s) 230, for example, can maintain and provide data related to historical performance of various warehouse equipment, workers, and/or teams. For example, the performance tracking system(s) 230 can provide data that indicates productivity rates (e.g., a number of warehouse operations per time period over a defined time range, such as over a previous week, month, quarter, etc.) of warehouse equipment, workers, and/or teams, such that productivity of current combinations of equipment, workers, and/or teams can be projected over a current shift. The configuration system(s) 240, for example, can maintain and provide data related to a configuration (e.g., physical layout, processing capabilities, available equipment, etc.) of the warehouse environment 100. Data received from the warehouse management system(s) 220, the performance tracking system(s) 230, and/or the configuration system(s) 240, for example, can be combined and stored in an enhanced warehouse data source 250 for use by the warehouse coordination system 210.

In the present example, the warehouse coordination system 210 can include and/or communicate with a plan creation interface generator 260, a performance monitoring interface generator 270, and a warehouse planning simulator 280. The plan creation interface generator 260, for example, can be used by the warehouse coordination system 210 to generate respective plan creation interfaces for presentation on each of the computing devices 122a-d (shown in FIG. 1A) when requested during the pre-shift period 132 (shown in FIG. 1B). The performance monitoring interface generator 270, for example, can be used by the warehouse coordination system 210 to generate respective performance monitoring interfaces for presentation on each of the computing devices 122a-d when requested during any of the shift periods 134a-c and/or during the end of shift recap period 146c (shown in FIG. 1B). The warehouse planning simulator 280, for example, can be used by the warehouse coordination system 210 (e.g., as part of a plan creation process) to run granular, discrete process simulations for operations to be performed by a team during a shift.

Figure 3:
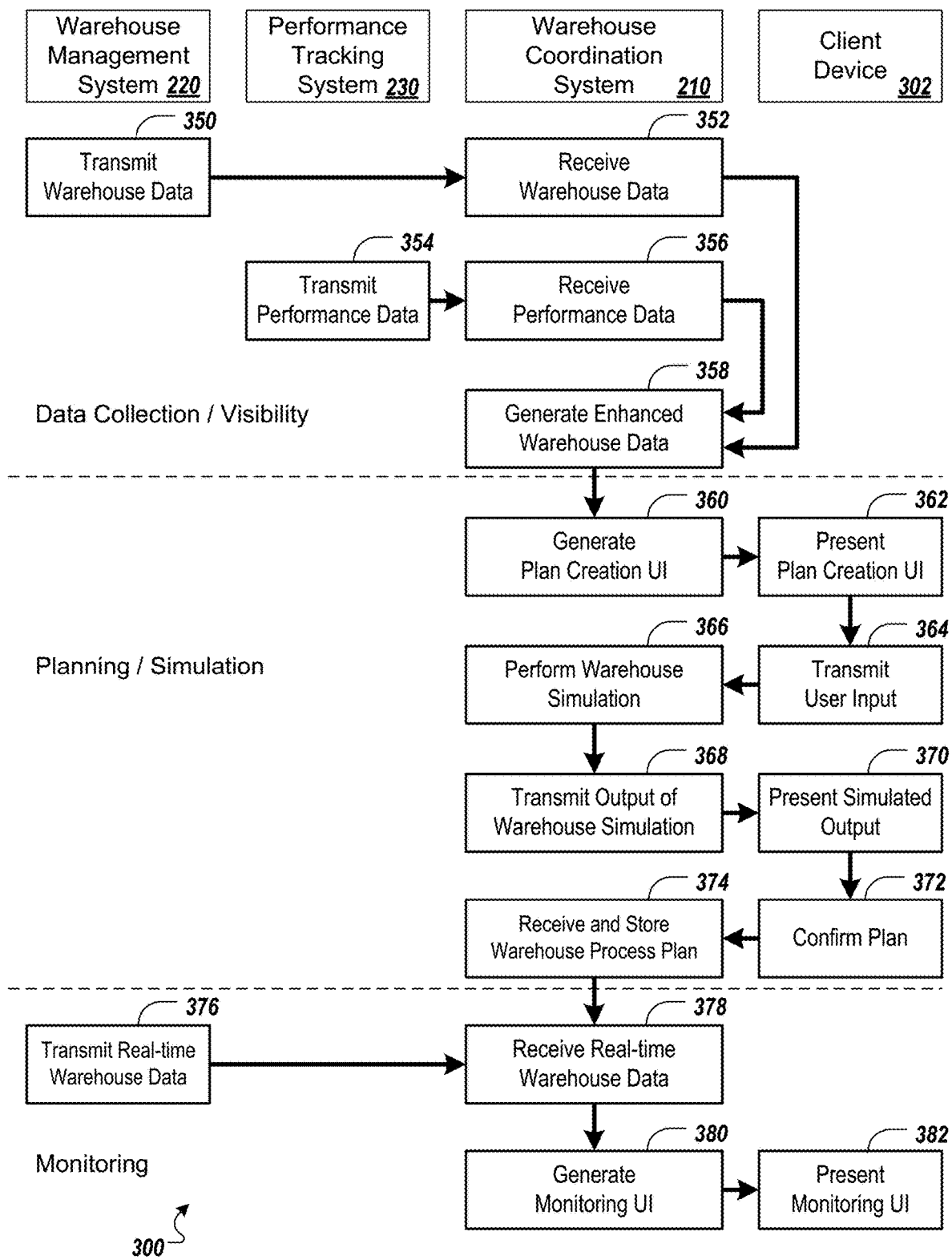
FIG. 3 is a flow diagram of an example technique for generating warehouse process plans and coordinating warehouse operations.

Referring now to FIG. 3, a flow diagram of an example technique 300 for generating warehouse process plans and coordinating warehouse operations is shown. In general, the example technique 300 includes data collection and visibility operations, planning and simulation operations, and monitoring operations that can be performed by various components of the system 200 (shown in FIG. 2) for generating warehouse process plans and coordinating warehouse operations. In the present example, the example technique 300 can be performed by the warehouse coordination system 210 (e.g., also shown in FIG. 2), the warehouse management system 220 (e.g., also shown in FIG. 2), the performance tracking system 230 (e.g., also shown in FIG. 2), the configuration system(s) 240 (e.g., also shown in FIG. 2) and a client device 302 (e.g., similar to any of the computing devices 122a-d, shown in FIG. 1A).

At 350, the warehouse management system 220 transmits warehouse data, and at 352, the warehouse coordination system 210 receives the warehouse data. Before, after, or concurrently, at 354, the performance tracking system 230 transmits performance data, and at 356, the warehouse coordination system 210 receives the performance data. Optionally, the configuration system(s) 240 (shown in FIG. 2) can transmit configuration data, and the warehouse coordination system 210 can receive such data. Referring to FIG. 1A, for example, during stage (A), the computing server(s) 160 (e.g., one or more computing servers for implementing components of the system 200) can receive warehouse, performance, and/or configuration data 170. The data 170, for example, can pertain to a current state of the warehouse environment 100, historical performance of various warehouse resources (e.g., equipment, workers, and/or teams), and/or a configuration of the warehouse environment and/or resources. Warehouse data received from the warehouse management system 220, for example, can include data related to current locations and contents of containers of goods in the warehouse environment 100, work that is to be performed in the warehouse environment 100 (e.g., goods to be received, moved, and/or sent), worker, teams, and equipment employed in the warehouse environment, and other relevant data for managing warehouse operations during a shift. Performance data received from the performance tracking system 230, for example, can include data related to historical performance (e.g., productivity statistics) of various equipment, workers, and/or teams in the warehouse environment 100. Configuration data received from the configuration system(s) 240, can pertain to a configuration of the warehouse environment 100.

At 358, the warehouse coordination system 210 generates enhanced warehouse data, based on the received warehouse data, performance data, and configuration data. Referring to FIG. 1A, for example, during stage (B), the computing server(s) 160 can generate enhanced data 172 based on the received warehouse/performance/configuration data 170, and can maintain the enhanced data 172 in data source(s) 162 (e.g., similar to the enhanced warehouse data source 250, shown in FIG. 2). For detailed and accurate planning, for example, neither warehouse data from the warehouse management system 220, nor performance data from the performance tracking system 230, nor configuration data from the configuration system(s) 240 may be entirely sufficient. For example, the warehouse data may include data related work tasks to be performed over a shift, but may lack data related to the performance capabilities of equipment, workers, and/or teams that perform the work tasks, and an environment in which the work tasks are performed. The performance data, for example, may include data related to performance capabilities, but may lack data related to work tasks to be performed. In general, generating the enhanced data 172 can include techniques for mapping performance capabilities of available equipment, workers, and/or teams to a backlog of work tasks to be performed, with respect to a particular environment. By generating and maintaining the enhanced data 172 in the data source(s) 162, and using the enhanced data for plan creation, work simulation, and progress monitoring applications, for example, load on the warehouse management system 220 and the performance tracking system 230 can be reduced. Further, by combining and cross-referencing data from the systems 220, 230, and 240, and preparing the data for use by the plan creation, work simulation, and progress monitoring applications, resources of the warehouse coordination system 210 can be conserved.

In some implementations, data related to performance capabilities may include productivity rates (e.g., a number of warehouse operations per time period) of various warehouse resources (e.g., equipment, workers, and/or teams or portions of teams). For example, performance data from the performance tracking system 230 can indicate that over a defined time range (e.g., the previous week, two weeks, four weeks, eight weeks, or another suitable time range), a team or a portion of a team (e.g., a specific picking team of the storage and retrieval team 120b, shown in FIG. 1A) has historically performed at a particular productivity rate (e.g., 250 cartons per hour) when picking a particular type of container (e.g., conveyable containers) from the storage area 110 (shown in FIG. 1A). When generating a production plan for the team, the performance data can be applied to work tasks to be performed to predict how many of the work tasks may be accomplished by the team during a shift. In some implementations, generating enhanced warehouse data may include attributing particular warehouse resources to warehouse tasks that have been and/or are being performed. For example, the warehouse management system 220 may store data that indicates that a warehouse task has been performed (e.g., a particular container of goods has been received at a particular time), but may lack data that indicates which warehouse resources performed the warehouse task. By attributing warehouse resources to warehouse tasks, for example, performance capabilities of various resources may be more readily determined.

In some implementations, generating enhanced warehouse data may include using configuration data that indicates how a warehouse is operationally and physically configured. For example, the data source(s) 162 (shown in FIG. 1A) can receive, maintain, and use data that maps areas of the warehouse environment 100 (shown in FIG. 1A) to various warehouse resources (e.g., equipment, workers, and/or teams or portions of teams) that are designated as being assigned to operate in the areas. As another example, the data source(s) 162 can use data that maps various warehouse resources and/or warehouse areas (e.g., one or more docks 102, shown in FIG. 1A) that are designated as being capable of handling containers 106 (shown in FIG. 1A) having particular properties (e.g., conveyable cartons, non-conveyable cartons, etc.). Based on the performance data and the configuration data, for example, a data linkage between work tasks to be performed during a shift, resources for performing the work tasks, and predicted productivities of the resources can be determined.

At 360, the warehouse coordination system 210 can use the plan creation interface generator 260 (shown in FIG. 2) to generate and provide data for a plan creation user interface. Referring to FIG. 1A, for example, during stage (C), the computing server(s) 160 can generate and provide data for plan creation user interface 180, for presentation and use by any of the computing devices 122a-d, shown in FIG. 1A). In general, the plan creation user interface 180 can be used by an operations manager of one of the teams 120a-d for creating a feasible work plan for their respective team, the work plan specifying work tasks to be accomplished by the team during a particular shift. In some implementations, a work plan may be optimized according to various optimization criteria (e.g., time, throughput, resources, etc.). For example, the plan creation user interface 180 can provide suggested sequencing and/or resource application values such that the work plan is optimized according to the criteria.

At 362, the plan creation user interface is presented by the client device 302 (e.g., similar to any of the computing devices 122a-d, shown in FIG. 1A). In general, plan creation interfaces may include multiple different screens which can be presented according to an application flow, in which an operations manager selects work tasks for their team to perform during a shift, the work tasks are sequenced, and resources (e.g., equipment, workers, and/or teams or portions of teams) are applied to the work. Once resources have been applied to the work tasks, for example, the work tasks can be simulated, and simulation results of performing the work tasks can be presented to the operations manager. If the simulation results are acceptable, for example, the operations manager may certify and submit a work plan that includes the selected, sequenced, and staffed work tasks. In some implementations, a different interface may be provided for creating work plans for each different team. For example, a receiving plan creation interface can be provided on computing device 122a for creating a work plan for the receiving team 120a, a storage and retrieval plan creation interface can be provided on computing device 122b for creating a work plan for the storage and retrieval team 120b, a sortation plan creation interface can be provided on computing device 122c for creating a work plan for the sortation team 120c, and a shipping plan creation interface can be provided on computing device 122d for creating a work plan for the shipping team 120d.

At 364, user input provided using the plan creation user interface is transmitted by the client device 302 for receipt by the warehouse coordination system 210. Referring to FIG. 1A, for example, the plan creation interface 180 can include a work task input interface 182 through which an operations manager (e.g., a manager of one of the teams 120a-d) can use various interface controls to select and sequence work tasks to be performed by their team during a shift, and to apply resources (e.g., equipment, workers, and/or teams or portions of teams) to the work tasks. In some implementations, at least a portion of the enhanced warehouse data can be presented on a plan creation user interface for a warehouse process. For example, the work task input interface 182 can present a list of work tasks that are available to be performed by a particular team during a particular shift (e.g., available work and/or work in progress, based on the enhanced data 172), and the operations manager can select from and sequence the available tasks. To assist the operations manager with applying resources to the work tasks, for example, the work task input interface 182 can present information related to resources that are available to the team during the shift (e.g., resource functions, productivity rates, and/or other relevant information, based on the enhanced data 172). Selection and sequencing of work tasks and application of the resources can be performed based on priority information presented along with the tasks, process guidelines of an organization, and/or expert knowledge of the operations manager, for example. In the present example, after the operations manager has selected and sequenced tasks (e.g., Task A, Task B, and Task C) to be performed by resources of their team (e.g., one of the teams 120a-d) during the shift, the operations manager can submit the selected, sequenced, and staffed work tasks for simulation by the computing server(s) 160, and can provide a command to run a simulation of performing the tasks by selecting the simulation control 184 of the work task input interface 182.

In response to receiving the user input and the simulation command, at 366, the warehouse coordination system 210 performs a simulation of the tasks to be performed over the shift for the warehouse process, according to the user inputs. For example, the warehouse coordination system 210 can receive from the client device 302 (e.g., similar to one of the computing devices 122a-d, shown in FIG. 1A) a data structure that includes data that indicates the selected, sequenced, and staffed work tasks input by the operations manager using the plan creation interface 180 (shown in FIG. 1), and can use the warehouse planning simulator 280 (shown in FIG. 2) to run a granular, discrete process simulation of the work tasks being performed in the warehouse environment 100 (shown in FIG. 1A). Running the process simulation, for example, can include modeling the selected work tasks according to the assigned sequence and the applied resources over time, using a collection of state variables that represent a current state of various warehouse entities (e.g., vehicles, equipment, workers, containers, products, etc.) within the warehouse environment 100. The state variables, for example, can be modified by the simulation to model an evolution of the state of the various warehouse entities over time.

At 368, the warehouse coordination system 210 transmits an output of the simulation of the tasks to be performed over the shift for the warehouse process, and at 370, the client device 302 presents the simulated output. Referring to FIG. 1A, for example, the plan creation interface 180 can include a simulation output interface 186 through which the operations manager can review the output of the simulation of the tasks (e.g., predicted throughput of a team over a shift when performing the warehouse process according to the specified plan). If the output is not acceptable, for example, the operations manager can again use the work task input interface 182 to adjust the work plan (e.g., by selecting different tasks, resequencing the tasks, and/or assigning different resources to the tasks), and can provide a command to run a simulation of the adjusted work plan. By experimenting with various different task, sequence, and resource scenarios, for example, operations managers can efficiently generate and refine feasible work plans for their respective teams. When the output is determined by the operations manager as being acceptable, for example, the operations manager can confirm and submit the work plan for his or her team for possible inclusion in an overall plan for a shift. In the present example, at 372 the work plan is confirmed and submitted by the operations manager at 372, who provides a command to confirm and submit the work plan by selecting the submission control 188 of the simulation output interface 186.

At 374, the warehouse coordination system 210 receives and stores the simulated warehouse process plan that specifies the tasks to be performed over the shift. Referring to FIG. 1A, for example, the computing server(s) 160 can store the plan in data source(s) 162, along with simulated output corresponding to the plan, and along with simulated plans/output for other warehouse teams 120a-d.

At 376, the warehouse management system 220 transmits real-time warehouse data, and at 378, the warehouse coordination system 210 receives the real-time warehouse data. Referring to FIG. 1A, for example, during stage (D), the computing server(s) 160 can receive real-time data 174 that pertains to work tasks being performed over the shift for the warehouse process in the warehouse environment 100. Real-time data provided by the warehouse management system 220, for example, can include data related to updated locations and/or contents of containers of goods in the warehouse environment 100, updated locations of equipment and/or workers in the warehouse environment 100, specific work tasks being performed by the equipment and/or workers, or other relevant real-time data. In some implementations, real-time data can be periodically or continually provided and received during a shift. For example, the warehouse management system 220 can periodically (e.g., once per minute, once every five minutes, once every fifteen minutes, or at another suitable time interval) provide updated batches of warehouse state data for receipt by the warehouse coordination system 210. As another example, the warehouse management system 220 can provide updated warehouse state data for receipt by the warehouse coordination system 210 as changes to the warehouse state occur.

At 380, the warehouse coordination system 210 can use the performance monitoring interface generator 270 (shown in FIG. 2) to generate and provide data for a performance monitoring user interface. Referring to FIG. 1A, for example, during stage (E), the computing server(s) 160 can generate and provide data for performance monitoring user interface 190. In general, the performance monitoring user interface 190 can be used by an operations manager of one of the teams 120a-d for comparing actual work progress during a shift according to real-time data, relative to predicted work progress during the shift according to the performed simulation of work tasks included in the warehouse process plan.

At 382, the performance monitoring user interface is presented by the client device 302 (e.g., similar to any of the computing devices 122a-d, shown in FIG. 1A). In general, performance monitoring user interfaces can include various numeric and/or graphical indications of actual work progress for a team during a shift, relative to predicted work progress for the team. In the present example, the performance monitoring user interface 190 includes a predicted work progress indicator 192 and an actual work progress indicator 194. The predicted work progress indicator 192, for example, represents work tasks that have been predicted to be performed by the team over the shift, according to the simulated warehouse process plan. The actual work progress indicator 194, for example, represents actual work tasks that have been performed by the team over the shift. As shown in the present example, the team overperformed during the first portion of the shift, then adjusted its performance (e.g., possibly as a result of a reallocation of resources prompted in one of the check & adjust periods 146a-b) such that its rate of performing work tasks was more closely aligned with its warehouse process plan. By aligning the actual production of teams to their respective production plans, for example, process bottlenecks and physical congestion can be reduced in the warehouse environment 100, improving overall efficiency across the various teams 120a-d. In some implementations, a different interface may be provided for presenting performance monitoring information for each different team. For example, a receiving performance monitoring interface can be provided on computing device 122a for monitoring performance of the receiving team 120a, a storage and retrieval performance monitoring interface can be provided on computing device 122b for monitoring performance of the storage and retrieval team 120b, a sortation performance monitoring interface can be provided on computing device 122c for monitoring performance of the sortation team 120c, and a shipping performance monitoring interface can be provided on computing device 122*d* for monitoring performance of the shipping team 120*d*.

Figure 4:
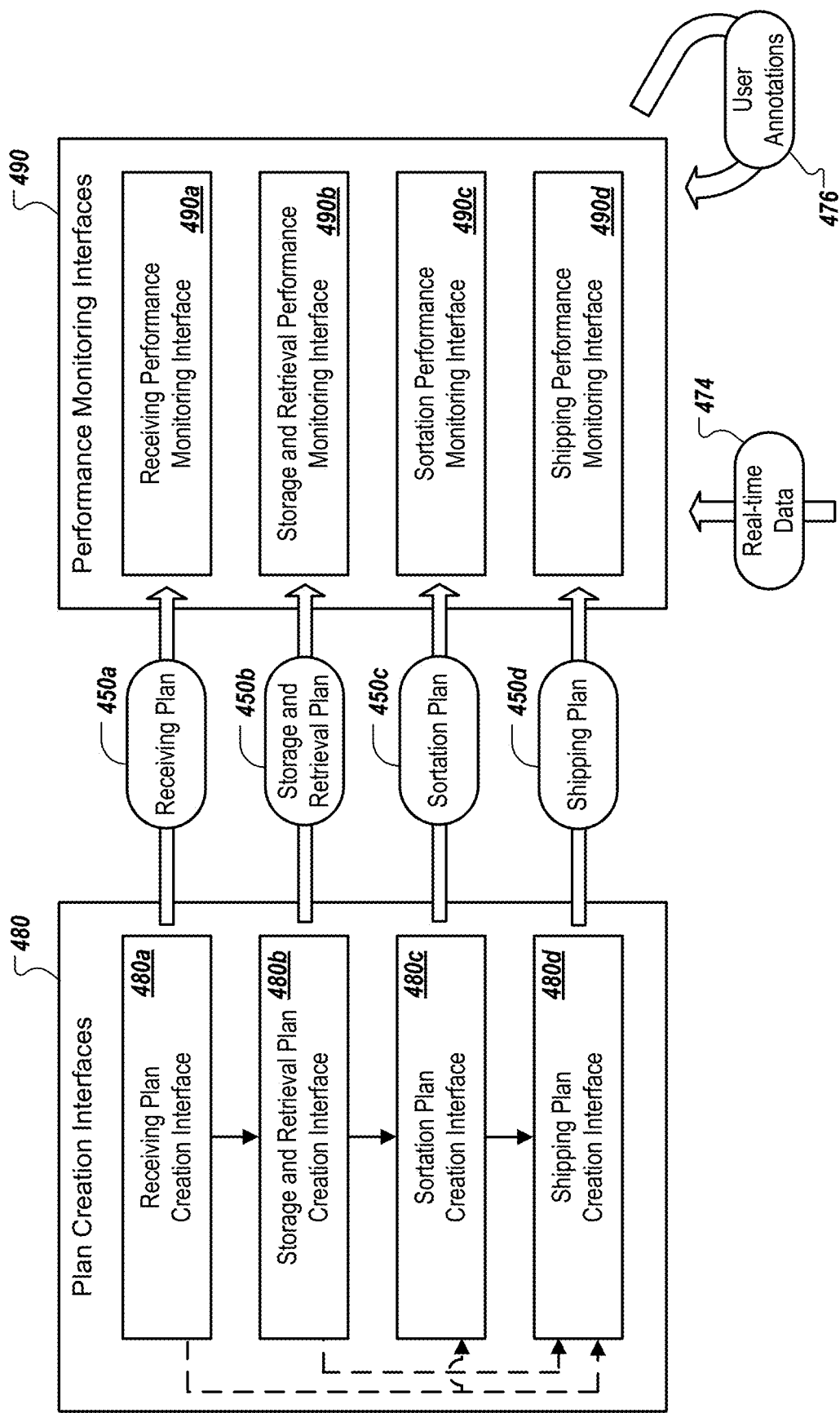
FIG. 4 shows example data interactions between warehouse process plan creation interfaces and warehouse performance monitoring interfaces.

Referring now to FIG. 4, example data interactions between warehouse process plan creation interfaces 480 and warehouse performance monitoring interfaces 490 are shown. Each of the plan creation interfaces 480 (e.g., similar to the plan creation interface 180, shown in FIG. 1A), for example, can be presented by a different computing device (e.g., one of the computing devices 122*a-d*, shown in FIG. 1A) used by an operation manager of a different team (e.g., one of the teams 120*a-d*, shown in FIG. 1A) to create a warehouse process plan for their respective team. In the present example, the plan creation interfaces 480 include a receiving plan creation interface 480*a* for creating a receiving plan 450*a* for the receiving team 120*a*, a storage and retrieval plan creation interface 480*b* for creating a storage and retrieval plan 450*b* for the storage and retrieval team 120*b*, a sortation plan creation interface 480*c* for creating a sortation plan 450*c* for the sortation team 120*c*, and a shipping plan creation interface 480*d* for creating a shipping plan 450*d* for the shipping team 120*d*.

In general, use of and interactions between the plan creation interfaces 480*a-d* can reflect operational workflow in a warehouse environment. For example, containers of goods in the warehouse environment 100 can generally be processed sequentially by the teams 120*a-d*, such that the containers are initially received by the receiving team 120*a*, are then handled by the storage and retrieval team 120*b*, are then optionally processed by the sortation team 120*c*, and are eventually shipped by the shipping team 120*d*. As shown in FIG. 4, and as shown in the shift timeline 130 of FIG. 1B, for example, the plan creation interfaces 480 can also be used sequentially to reflect the operational workflow, such that output resulting from simulation of planned work tasks of a first team is used as input for creating a work plan for a second team, after the work plan for the first team is confirmed and submitted by the first team's operations manager. In the present example, output resulting from simulation of planned work tasks for the receiving team 120*a* can be used as input for creating a work plan for the storage and retrieval team 120*b*, output resulting from simulation of planned work tasks for the storage and retrieval team 120*b* can be used as input for creating a work plan for the sortation team 120*c*, and output resulting from simulation of planned work tasks for the sortation team 120*c* can be used as input for creating a work plan for the shipping team 120*d*. In some implementations, output resulting from simulation of planned work tasks for an upstream team can be used as input for creating a work plan for any downstream team. For example, output resulting from simulation of planned work tasks for the receiving team 120*a* can be used as input for creating a work plan for the storage and retrieval team 120*b*, the sortation team 120*c*, and the shipping team 120*d*. Similarly, for example, output resulting from simulation of planned work tasks for the storage and retrieval team 120*b* can be used as input for creating a work plan for the sortation team 120*c* and the shipping team 120*d*. By cascading output generated using plan creation interfaces as input into other plan creation interfaces, for example, warehouse simulation processes can be simplified (e.g., by limiting the number of process variables), while promoting collaboration between the various teams.

In general, the performance monitoring interfaces 490 can be used to compare real-time work progress for various warehouse processes to simulated work plans. Real-time work progress, for example, can be determined based on real-time data 474 (e.g., similar to the real-time data 174, shown in FIG. 1A). Each of the performance monitoring interfaces 490 (e.g., similar to the performance monitoring interface 190, shown in FIG. 1A), for example, can be presented by a different computing device (e.g., one of the computing devices 122*a-d*, shown in FIG. 1A) used by an operation manager of a different team (e.g., one of the teams 120*a-d*, shown in FIG. 1A) to monitor performance of their respective team. In the present example, the performance monitoring interfaces 490 include a receiving performance monitoring interface 490*a* for monitoring performance of the receiving team 120*a* relative to the receiving plan 450*a*, a storage and retrieval performance monitoring interface 490*b* for monitoring performance of the storage and retrieval team 120*b* relative to the storage and retrieval plan 450*b*, a sortation performance monitoring interface 490*c* for monitoring performance of the sortation team 120*c* relative to the sortation plan 450*c*, and a shipping performance monitoring interface 490*d* for monitoring performance of the shipping team 120*d* relative to the shipping plan 450*d*.

In some implementations, performance monitoring interfaces may include mechanisms for receiving feedback based on observations related to real-time work progress for various warehouse processes relative to simulated work plans. For example, each of the performance monitoring interfaces 490*a-d* can include one or more controls for providing user annotations 476 (e.g., comments, markup, ratings, etc.) that are used to update the respective interface 490*a-d* (and, optionally, one or more other interfaces 490*a-d*). The user annotations 476, for example, can provide context for reported productivity metrics, and can be shared among various operations managers to help identify root causes of potential problems within the warehouse environment 100 and to help make collective decisions.

Figure 5A:
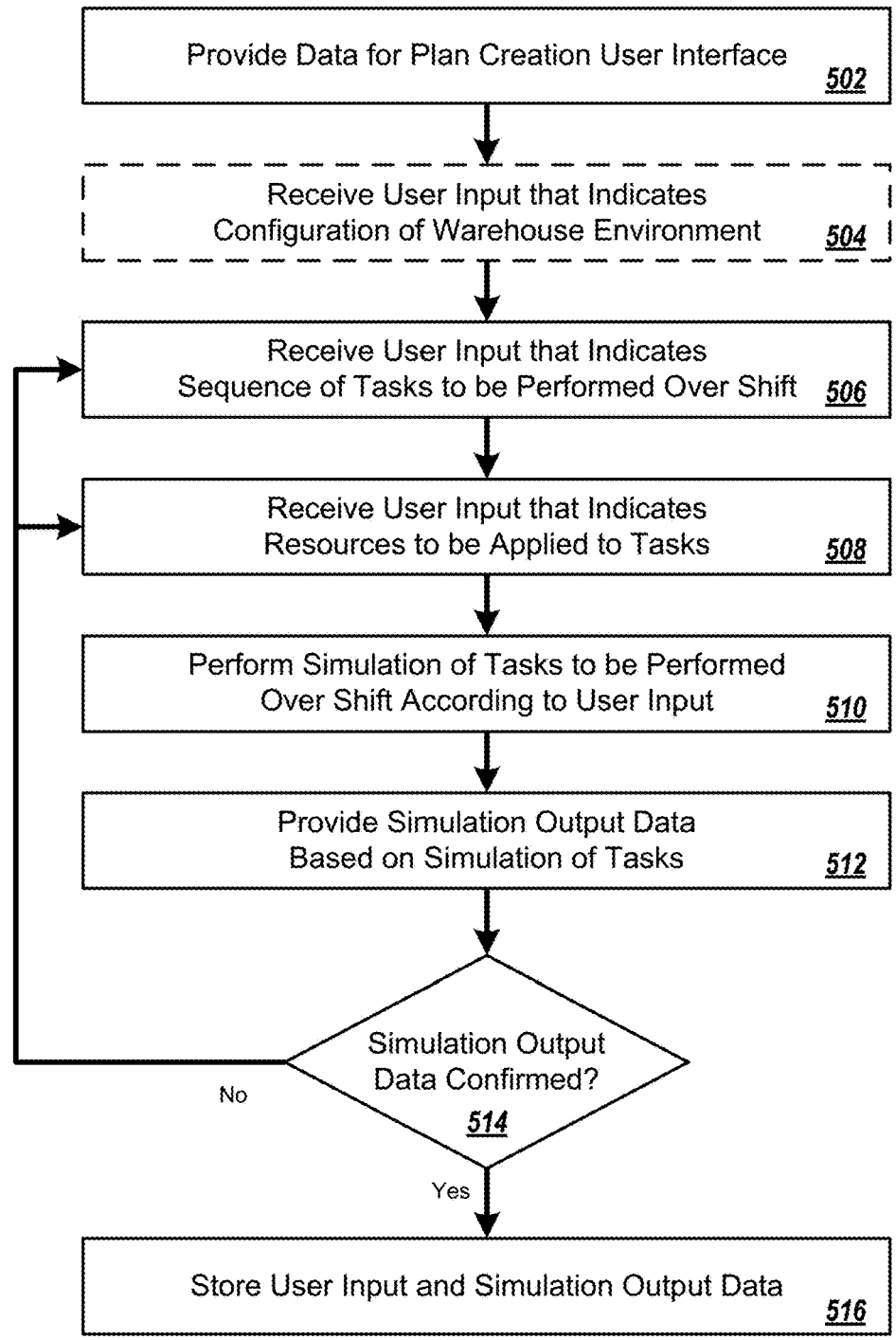
FIGS. 5A-B are flow diagrams of an example techniques for providing plan creation user interfaces for warehouse processes.

Referring now to FIG. 5A, a flow diagram of an example technique 500 for providing a plan creation user interface for a warehouse process is shown. In the present example, the example technique can be performed by the computing server(s) 160 (e.g., shown in FIG. 1A, implementing components of the system 200 (shown in FIG. 2)), and any of the computing devices 120*a-d* (shown in FIG. 1A).

Plan creation user interfaces can be used by various operations managers (e.g., respective managers of the receiving team 120*a*, the storage and retrieval team 120*b*, the sortation team 120*c*, and the shipping team 120*d*). By using the plan creation user interfaces, for example, the operations managers can quickly generate and simulate plans for their portion of the warehouse. The plan creation user interfaces, for example, can facilitate creating a sequence for work to be performed during a shift, applying labor assumptions and staffing to that work, simulating the performance of the work according to the created sequence, iteratively applying modifications to a work plan, and then uploading the work plan. The plan creation user interfaces can include a variety of features to help guide a user through a planning process, for example, including providing guidance on the historical performance of a particular team for which work is being planned, current warehousing loads, information from other teams that impact the particular team for which work is being planned, and alerts to identify deficiencies or other problems with a proposed plan.

In general, different plan creation interfaces may be provided for creating plans for various different warehouse teams that each perform different types of warehouse operations. As described with respect to FIG. 4, for example, different plan creation interfaces can be provided for creating plans for the receiving team 120*a*, the storage and retrieval team 120*b*, the sortation team 120*c*, and the shipping team 120*d*. A general application flow of each of the different plan creation interfaces is described with respect to FIG. 5A, for example, however each different plan creation interface can be customized to possibly have a different application flow, and/or to generate a plan for a different warehouse process. In further detail, example receiving plan creation user interfaces are described below with respect to FIGS. 6A-F, example storage and retrieval plan creation user interfaces are described below with respect to FIGS. 7A-K, and example shipping plan creation user interfaces are described below with respect to FIGS. 8A-D.

At 502, data can be provided for a plan creation user interface. For example, a warehouse coordination system implemented by the computing server(s) 160 can generate and provide data for plan creation user interface 180, for presentation and use by any of the computing devices 122*a-d*. For example, data can be provided for receiving plan creation interface 480*a* (e.g., shown in FIG. 4, and depicted in further detail in FIGS. 6A-F) to be presented by computing device 122*a* of receiving team 120*a*. As another example, data can be provided for a storage and retrieval plan creation interface 480*b* (e.g., shown in FIG. 4 and depicted in further detail in FIGS. 7A-K) to be presented by computing device 122*b* of storage and retrieval team 120*b*. As another example, data can be provided for a sortation plan creation interface 480*c* (e.g., shown in FIG. 4) to be presented by computing device 122*c* of sortation team 120*c*. As another example, data can be provided for a shipping plan creation interface 480*d* (e.g., shown in FIG. 4 and depicted in further detail in FIGS. 8A-D) to be presented by computing device 122*d* of shipping team 120*d*.

At 504, user input can optionally be received that indicates a configuration of a warehouse environment. For example, the warehouse coordination system implemented by the computing server(s) 160 can receive user input through a warehouse configuration portion of the plan creation interface 180 (e.g., as described in further detail in examples below) that indicates a configuration of the warehouse environment 100 in which a warehouse process is to be performed. Configuration information provided through the configuration portion of the plan creation interface 180, for example, can include information that may not be available from the warehouse management system(s) 220 (shown in FIG. 2) or performance tracking system(s) 230 (shown in FIG. 2), such as information maintained by configuration system(s) 240 (shown in FIG. 2) related to docks 102, storage racks 112, and/or equipment 116 that are available (or unavailable) for performing tasks during a shift, and other relevant warehouse configuration information.

At 506, user input can be received that indicates a sequence of tasks to be performed over a shift. For example, the warehouse coordination system implemented by the computing server(s) 160 can receive user input through a sequencing portion of the plan creation interface 180 (e.g., as described in further detail in examples below) that indicates a sequence of tasks to be performed over a shift for a particular warehouse process (e.g., a receiving process, storage and retrieval processes, a sortation process, a shipping process, or other warehouse processes). In some implementations, a sequencing portion of a plan creation user interface may include a list of tasks that are available to be performed over the shift for the warehouse process. For example, one or more controls (e.g., data entry controls on the plan creation user interface 180) can be provided for selecting from the list of available tasks and sequencing the selected tasks.

At 508, user input can be received that indicates resources to be applied to tasks. For example, the warehouse coordination system implemented by the computing server(s) 160 can receive user input through a resource allocation portion of the plan creation interface 180 (e.g., as described in further detail in examples below) that indicates resources (e.g., equipment, workers, and/or teams or portions of teams) to be applied to the tasks to be performed over the shift for the warehouse process. In some implementations, a resource allocation portion of a plan creation user interface may include, for each of multiple periods of a warehouse shift, one or more controls for indicating resources to be allocated. For example, the one or more controls (e.g., data entry controls on the plan creation user interface 180) can include controls for indicating a number of workers to be staffed during each period of a shift.

At 510, a simulation of tasks to be performed over the shift can be executed, according to the received user input. For example, the warehouse coordination system implemented by the computing server(s) 160 can receive, through the plan creation interface 180, a simulation command to execute a simulation of the tasks to be performed over the shift for the warehouse process (e.g., as a result of a user selecting the simulation control 182). In response to receiving the simulation command, for example, the warehouse coordination system can execute a simulation of the tasks to be performed over the shift for the warehouse process. The simulation, for example, can be executed according to the user input that indicates the sequence of tasks to be performed, and according to the user input that indicates the resources to be applied to the tasks. Optionally, the simulation of the tasks to be performed over the shift for the warehouse process can also be performed according to the user input that indicates the configuration of the warehouse environment.

At 512, simulation output data can be provided, based on results of the simulation of tasks to be performed. For example, the warehouse coordination system implemented by the computing server(s) 160 can provide simulation output data resulting from the simulation of the tasks to be performed, for presentation by a simulation output portion of the plan creation interface 180 (e.g., as described in further detail in examples below).

At 514, the simulation output data can be confirmed. For example, a user (e.g., an operations manager) of the plan creation interface 180 can review the simulation output data and determine whether the data is acceptable. If the simulation output data is not acceptable, for example, the user can return to a sequencing portion of the plan creation interface 180 for providing user input that indicates a sequence of tasks to be performed over the shift (506) and/or can return to a resource allocation portion of the plan creation interface 180 for providing user input that indicates resources to be applied to the tasks to be performed over the shift (508). After updated user input is provided, for example, another simulation of tasks can be executed according to the updated user input (510), and updated simulation output data can be provided based on the task simulation (512). If the simulation output data is acceptable, for example, the user can provide a confirmation command (e.g., by selecting the submission control 188), and the warehouse coordination system implemented by the computing server(s) 160 can receive the confirmation command that confirms the simulation output data.

At 516, the user input and simulation output data can be stored. For example, in response to receiving the confirmation command that confirms the simulation output data, the warehouse coordination system implemented by the computing server(s) 160 can store (e.g., in data source(s) 162) the user input that indicates the sequence of tasks to be performed, the user input that indicates the resources to be applied to the tasks, and the simulation output data based on the simulation of the tasks to be performed. In some implementations, at least a portion of the simulation output data can be provided for use by a different plan creation user interface for a different warehouse process (e.g., a downstream operation that processes output produced by an upstream operation). For example, simulation output data corresponding to a receiving process can be used by a storage plan creation user interface for a storage process. As another example, simulation output data corresponding to a retrieval process can be used by a sortation plan creation user interface for a sortation process and/or can be used by a shipping plan creation user interface for a shipping process. As another example, simulation output data corresponding to a sortation process can be used by a shipping plan creation user interface for a shipping process. As described in further detail in examples below, the portion of the simulation output data can include a list of tasks that are available to be performed over the shift for the different, downstream warehouse process.

Figure 5B:
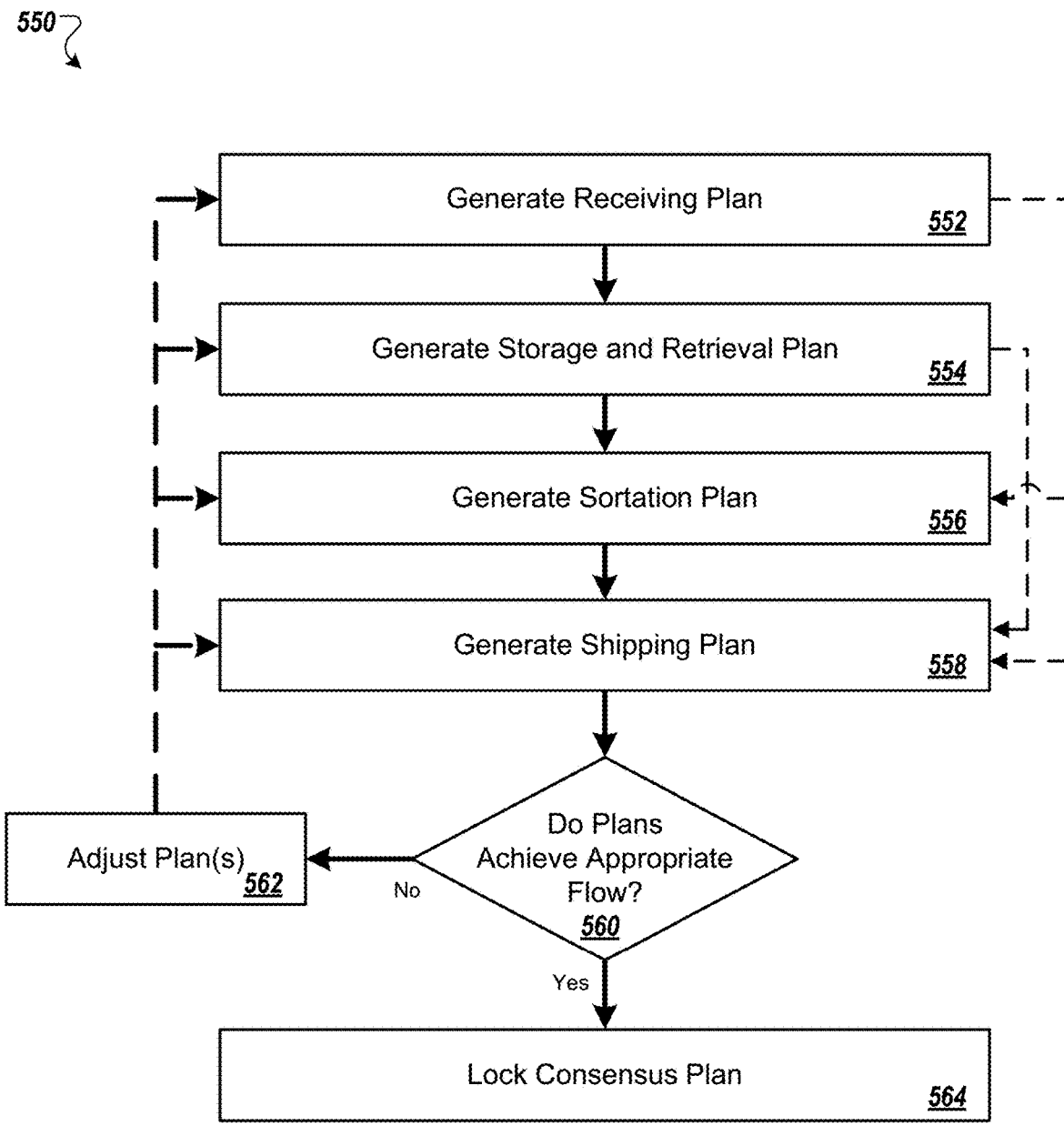

Referring now to FIG. 5B, a flow diagram of an example technique 550 for providing plan creation user interfaces for warehouse processes is shown. For example, different plan creation user interfaces can be provided for creating plans for various different warehouse teams that each perform different warehouse operations (e.g., receiving operations, storage and retrieval operations, sortation operations, and shipping operations), and the plans can be analyzed together to determine whether the combination of plans is predicted to achieve appropriate workflow in a warehouse environment. If appropriate workflow is not predicted to be achieved, for example, one or more inputs for one or more plans can be adjusted (e.g., configuration input, task sequence input, resource application input), and the respective plans (and optionally, any impacted downstream plans) can be regenerated by performing another simulation of tasks according to the user input. After appropriate workflow has been predicted to be achieved, for example, a consensus plan including the different warehouse operation plans can be locked. In the present example, the example technique can be performed by the computing server(s) 160 (e.g., shown in FIG. 1A, implementing components of the system 200 (shown in FIG. 2)), and any of the computing devices 120a-d (shown in FIG. 1A).

At 552, a receiving plan can be generated. As described with respect to FIG. 5A, for example, the warehouse coordination system implemented by the computing server(s) 160 can generate a receiving plan that includes simulation output data resulting from a simulation of tasks to be performed by the receiving team 120a over a shift. The simulation output data for the receiving plan 450a (shown in FIG. 4), for example, can be generated based on user input provided through the receiving plan creation interface 480a (e.g., shown in FIG. 4, and depicted in further detail in FIGS. 6A-F) presented by computing device 122a.

At 554, a storage and retrieval plan can be generated. As described with respect to FIG. 5A, for example, the warehouse coordination system implemented by the computing server(s) 160 can generate a storage and retrieval plan that includes simulation output data resulting from a simulation of tasks to be performed by the storage and retrieval team 120b over the shift. The simulation output data for the storage and retrieval plan 450b (shown in FIG. 4), for example, can be generated based on user input provided through the storage and retrieval plan creation interface 480b (e.g., shown in FIG. 4, and depicted in further detail in FIGS. 7A-K) presented by computing device 122b, and optionally, based on simulation output data from one or more upstream operations (e.g., a generated receiving plan).

At 556, a sortation plan can be generated. As described with respect to FIG. 5A, for example, the warehouse coordination system implemented by the computing server(s) 160 can generate a sortation plan that includes simulation output data resulting from a simulation of tasks to be performed by the sortation team 120c over the shift. The simulation output data for the sortation plan 450c (shown in FIG. 4), for example, can be generated based on user input provided through the sortation plan creation interface 480c (e.g., shown in FIG. 4) presented by computing device 122c, and optionally, based on simulation output data from one or more upstream operations (e.g., a generated storage and retrieval plan and/or a generated receiving plan).

At 558, a shipping plan can be generated. As described with respect to FIG. 5A, for example, the warehouse coordination system implemented by the computing server(s) 160 can generate a shipping plan that includes simulation output data resulting from a simulation of tasks to be performed by the shipping team 120d over the shift. The simulation output data from the shipping plan 450d (shown in FIG. 4), for example, can be generated based on user input provided through the shipping plan creation interface 480d (e.g., shown in FIG. 4, and depicted in further detail in FIGS. 8A-D) presented by computing device 122d, and optionally, based on simulation output data from one or more upstream operations (e.g., a generated sortation plan, a generated storage and retrieval plan, and/or a generated receiving plan).

At 560, generated warehouse process plans can be analyzed to determine whether the combination of plans achieves appropriate workflow in a warehouse environment. Referring to FIG. 1B, for example, during pre-shift period 132e, the work plans generated during pre-shift periods 132a-d can be reviewed and analyzed in combination, to determine whether the overall workflow throughout the warehouse environment 100, according to the work plans, achieves operational goals. Operational goals, for example, may include overall throughput through a warehouse environment (e.g., a number of processed containers per shift across multiple teams), prioritized production by one or more teams (e.g., a number of containers received, a number of containers shipped, etc.), time-based goals (e.g., transporting containers of goods by a specified date), safety-based goals, or other suitable goals.

At 562, if the combination of plans is not predicted to achieve appropriate workflow, one or more inputs can be adjusted for regenerating one or more plans. For example, if operations performed by one of the teams is prioritized over other teams (e.g., receiving operations are prioritized because of increased inbound shipments, shipping operations are prioritized because of increased outbound shipments and/or delivery deadlines, etc.), resources may be shifted from teams having lesser priority to teams having greater priority to meet the overall goals of an organization. As another example, if one or more teams is predicted to experience backlog issues or other throughput difficulties according to a simulated plan (e.g., as a result of overproduction by an upstream team), resources may be shifted to alleviate the problem and streamline overall operations. After adjusting the inputs for one or more plans, for example, the plans can be regenerated by performing another simulation of tasks for each of the adjusted plans and any impacted downstream plans. For example, if a storage and retrieval plan is to be adjusted in order to improve overall workflow (e.g., by shifting resources to, from, and/or across portions of the storage and retrieval team 120b), the storage and retrieval plan can be regenerated by performing an updated simulation at 554. In the present example, simulation output data of the storage and retrieval plan is used in part for generating the sortation plan and the shipping plan. The sortation plan can be regenerated at 556 (e.g., based on updated simulation output data for the storage and retrieval plan and optionally updated user input), for example, and the shipping plan can be regenerated at 558 (e.g., based on updated simulation output data for the storage and retrieval plan, updated simulation output data for the sortation plan, and optionally updated user input). Since the receiving plan is not downstream from the storage and retrieval plan, the receiving plan may not be impacted by adjustments to the storage and retrieval plan, and is not regenerated in the present example. By appropriately adjusting warehouse process plans and impacted downstream plans for discrete warehouse processes, for example, computing resources for generating simulation output can be conserved while quickly generating a consensus plan (e.g., an overall plan that includes multiple different discrete warehouse process plans) that achieves overall organizational goals.

At 564, after the combination of plans is predicted to achieve appropriate workflow (e.g., possibly after one or more iterations and adjustments), the consensus plan can be locked. For example, at the end of pre-shift period 132e (shown in FIG. 1B), the consensus plan (e.g., including the receiving plan, the storage and retrieval plan, the sortation plan, and the shipping plan) can be locked, and the computing server(s) 160 can store the consensus plan in data source(s) 162, along with the simulated output according to the plans. During the shift, for example, real-time warehouse data can be used to compare work progress of the various teams 120a-d, relative to predicted work progress according to the performed simulation of work tasks, for each of the generated warehouse process plans.

Referring now to FIGS. 6A-F, example receiving plan creation user interfaces (and/or portions of user interfaces) are shown. In general, the receiving plan creation user interface(s) can be used to evaluate an amount of incoming volume to a warehouse and to allocate staffing resources, such that high productivity and accuracy are maintained.

Figure 6A:
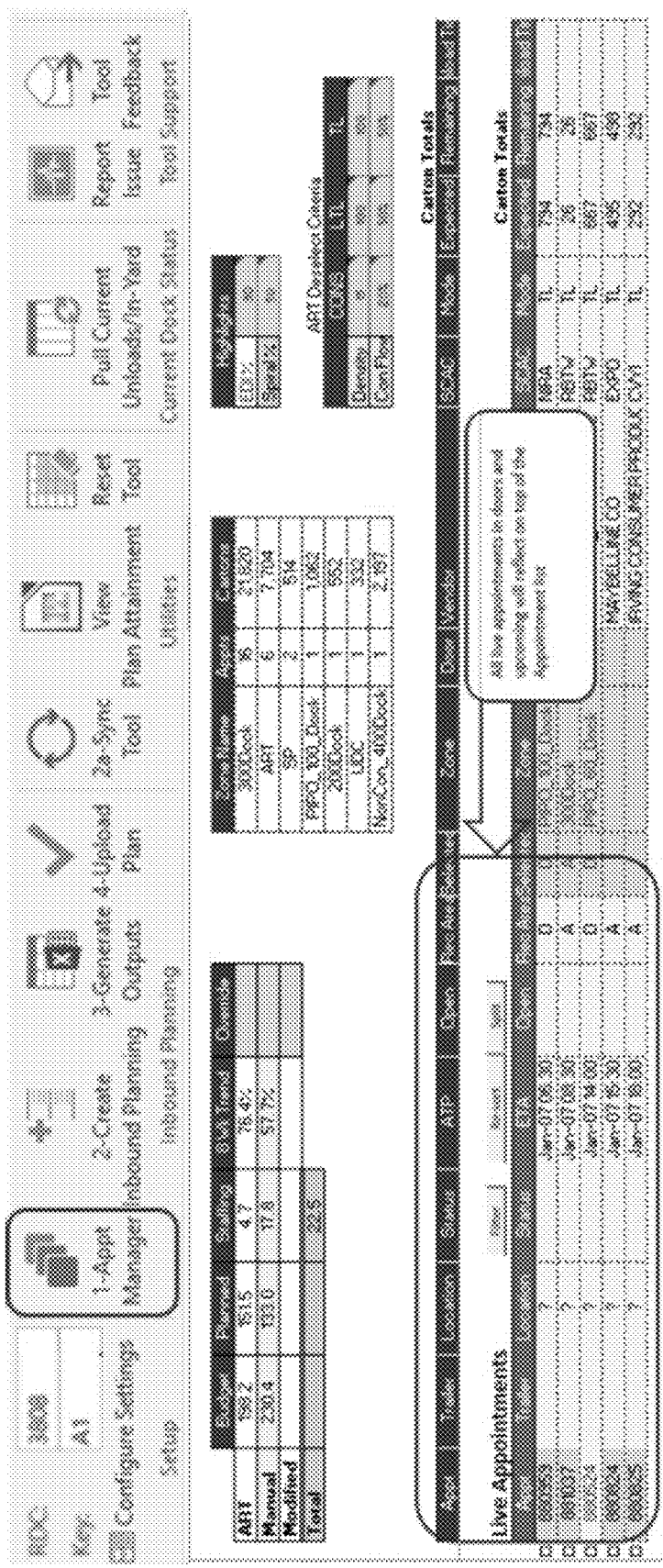

FIG. 6A, for example, shows a portion of a receiving plan creation user interface that can be used to receive user input that indicates a configuration of a warehouse environment as it applies to inbound appointments, and to receive user input that indicates tasks to be performed over a shift for a receiving process. In the present example, the portion of the receiving plan creation user interface can be presented in response to a user selecting an "Appointment Manager" control, and can be used to generate a list of inbound appointments based on various factors (e.g., status (live/open/queue), item count, purchase order (PO) quantity, total carton at process flow level, and other suitable factors). Based on the status of the appointment, for example, the first lists generated can be that of a live appointment. As shown in the present example, an Estimated Time of Arrival (ETA) of the appointment can be provided along with details related to a recommended area. An "Appointment" column, for example, shows an identifier for the appointment. A "Trailer" column, for example, shows a trailer number for the appointment. A "Location" column, for example, shows the detail of a trailer as being in-yard ("Y") or in-door ("D"). An "ATP/ETA" (Available to Process/Estimated Time of Arrival) column, for example, provides information on a time at which the trailer is in-yard (e.g., available to be received) and run through PRD (Post Received Distribution), to identify a destination for each carton on the trailer. An "Open" column, for example, provides information on an amount of time the trailer is open at the door. If the Location is marked as being in-door ("D"), for example, the amount of time the trailer is open at the door can be shown under the "Open" column. If the Location is marked as being in-yard ("Y"), for example, the "Open" column does not show any result. A "Recommended Area" column can be marked with a recommendation as being either "D" for dock or "A" for ART (Automated Receiving Technology), for example. A user of the receiving plan creation interface can consider the recommendation, and can select an area for processing the appointment, for example. In the present example, input can be provided under the "Select" column, by either choosing "D" or "A" from a drop-down control. In addition, a "Zone" column provides a selectable zone list, for example, based on a vendor, appointment, and type of carton process flow.

Figure 6B:
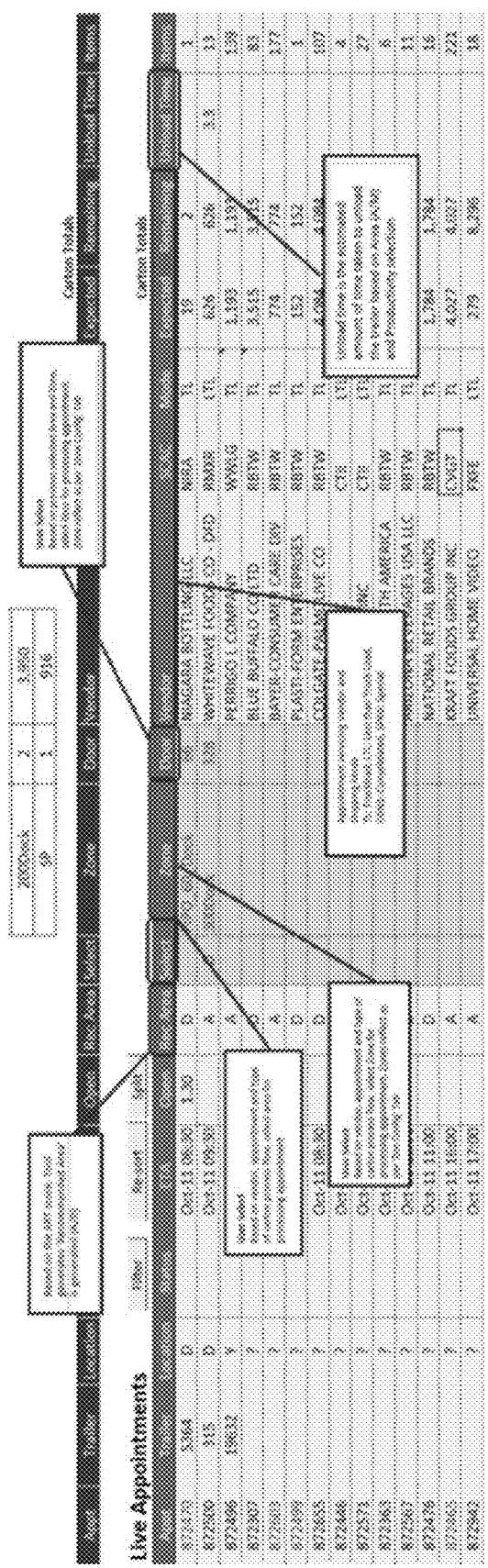

FIG. 6B, for example, shows the portion of the receiving plan creation user interface as described with respect to FIG. 6A, in further detail. After assigning the Selected Area and Zone, for example, the user can select a door at which the appointment is to be processed. The "Door" column, for example, can provide a list that includes doors that have been assigned to the previously selected Area and Zone. The receiving plan creation user interface can include a "Filter" control, for example, for filtering the appointments to make a Zone/Door selection, and a "Re-sort" control to facilitate returning to a list populated by the interface. Various Vendor details can be provided, for example, including a Vendor Name, a Standard Carrier Alpha Code (SCAC) based on which operational call can be taken to prioritize a trailer, and a Mode of Transport used (e.g., truckload, less than truckload, consolidated, special, etc.). The "Unload Time" column, for example, can be an estimated amount of time for unloading a trailer based on an Area and Productivity selection.

Figure 6C:
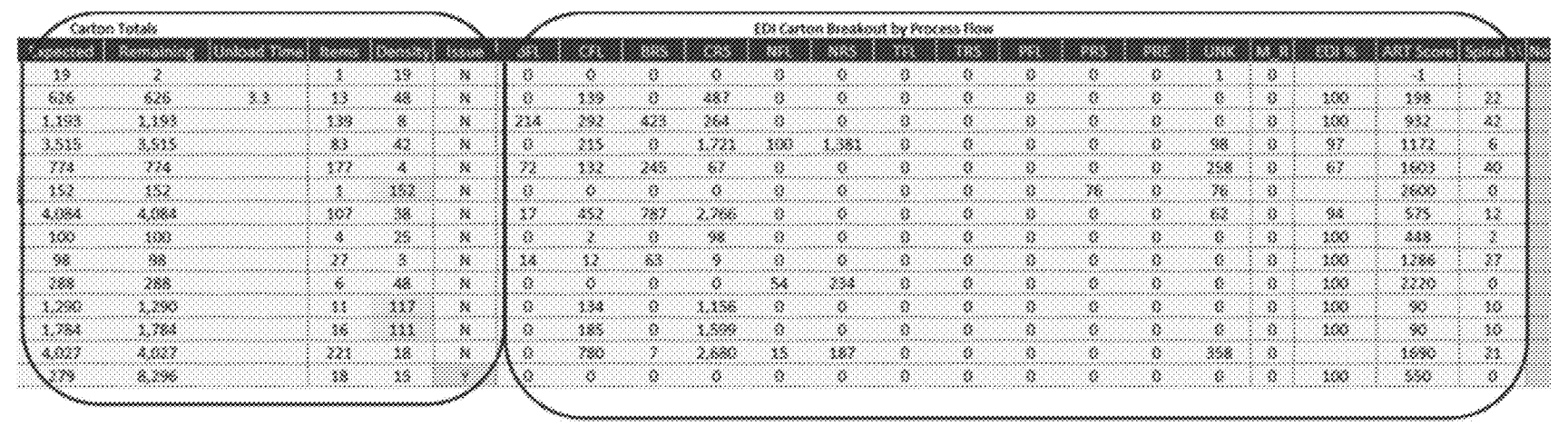

FIG. 6C, for example, shows appointment details that that are based on various data sources. For example, generated data under "Carton Totals" can be based on PO Level information, and can aggregate PO Carton Volume Details at an appointment level. Carton quantity, for example, can be based on Expected, Received, and Remaining carton totals. For multiple POs arriving in one appointment, for example, a carton can include a carton quantity of all the POs. An "Unload Time" column, for example, can provide details related to an amount of time taken to unload the trailer based on the area selected for the trailer (e.g., Art/Manual/Mod Manual), and the productivity associated with the trailer. In addition, many warehouses and distribution centers may use density as one of the factors to decide if an appointment should be directed to a particular zone/door. The receiving plan creation interface, for example, can highlight any appointment that has a density that exceeds a particular threshold value (e.g., 50 units, 100 units, 200 units, or another value). An "Issue" column can be marked as "Yes" if there is no EDI % (Electronic Data Interchange) provided for an appointment, for example. For example, some vendors and/or transportation companies may provide data that indicates the contents a cartons on a trailer, whereas others may not. An "Items" column, for example, can provide details on a total number of unique items in the trailer. In the present example, a combination of vendor, carton quantity, density, and items can provide guidance for directing an appointment to a particular door. Data generated under "EDI Carton Breakout," for example, can be based on EDI data, and can provide carton breakout based on process flow. Cartons for which information is unavailable can be classified as "Unknown," for example. An "ART Score" column, for example, lists an ART score. In general, appointments with higher scores may be better suited for a more complex set, and appointments with lower scores may be better suited for a smooth set. Appointments with higher scores, for example, may not be ideal candidates to de-select to manual dock due to their complexity. An "EDI %" column, for example, can indicate a percentage of cartons that match with a total PO carton quantity. A "Spiral %" column, for example, can indicate a percentage of items which flow through a Spiral Network (e.g., Spiral Cartons/Total Cartons).

Once the appointments are assigned, for example, the plan creation user interface can be used to provide additional details regarding the appointments. Referring again to FIG. 6A, for example, an overview can be provided that breaks down Cartons Per Hour (CPH) by area (e.g., ART and Manual Dock). For each area, for example, planned, staffing, and trend information can be provided. A "Budget" column, for example, can indicate a selected volume for each mode mix divided by a current month's budget for each mode mix. A "Planned" column, for example, can indicate a selected volume for each mode mix divided by a team's current performance to budget. A "Staffing" column, for example, can indicate a selected volume divided by planned productivity divided by hours in a shift. A "Trend" column, for example, can indicate a team's performance to budget over a previous number of weeks (e.g., 4 weeks, 8 weeks, 12 weeks, or another suitable number of weeks). User input can be provided under an "Override" column, for example, to modify productivities used in CPH and appointment unload times. Values entered under the "Override" column, for example, can be a number value, and can be entered for ART, Manual Dock, both, or neither. Based on the allocation, for example, the total number of appointments and total carton quantity can be provided to users with respect to volumes generated for a shift. If capacity constraints exist based on zone, for example, such directional numbers can be used to take action by making adjustments to the appointments.

In the present example shown in FIG. 6A, a zone overview can be provided that provides high-level carton quantity details based on the selected appointments, along with counts of the appointments. In the present example, a "Zone Name" column indicates a zone, an "Appointments" column indicates a number of appointments for the zone, and a "Cartons" column indicates a number of cartons for the zone. The zone overview can be used for making operational decisions, for example.

In the present example shown in FIG. 6A, a highlights designation control can be provided that highlights Appointment IDs based on EDI % and Spiral %. If an EDI % of an appointment is lower than a number entered by the user, for example, the corresponding Appointment ID may be highlighted (e.g., with a designated highlight color, a designated font color, etc.). Similarly, if a Spiral % of an appointment is higher than a number entered by the user, for example, the corresponding Appointment ID may be highlighted (e.g., with a designated, possibly different highlight color, font color, etc.).

In the present example shown in FIG. 6A, an ART Deselect Criteria control can be provided. For example, appointments for which the recommended area is "ART" can be revisited based on criteria which is provided through the ART Deselect Criteria control. Additional resources can be provided to identify appointments which are best suited to be assigned to "Manual Dock," for example. In the present example, users can be provided with options to provide criteria based on Density and a percentage of Total Items as Conveyable Flow, and an appointment can be categorized based on "Mode" (e.g., Consolidator, LTL or Truck Load). For example, if the Density criteria is set to 15 for appointments which arrived through a consolidator, and 20% of total items were conveyable items, the recommended area for an "ART" appointment can be highlighted. Thus, in the present example, users can be provided with clear direction for assigning the appointment for "Manual Dock" without taking the recommended area into consideration.

Figure 6D:
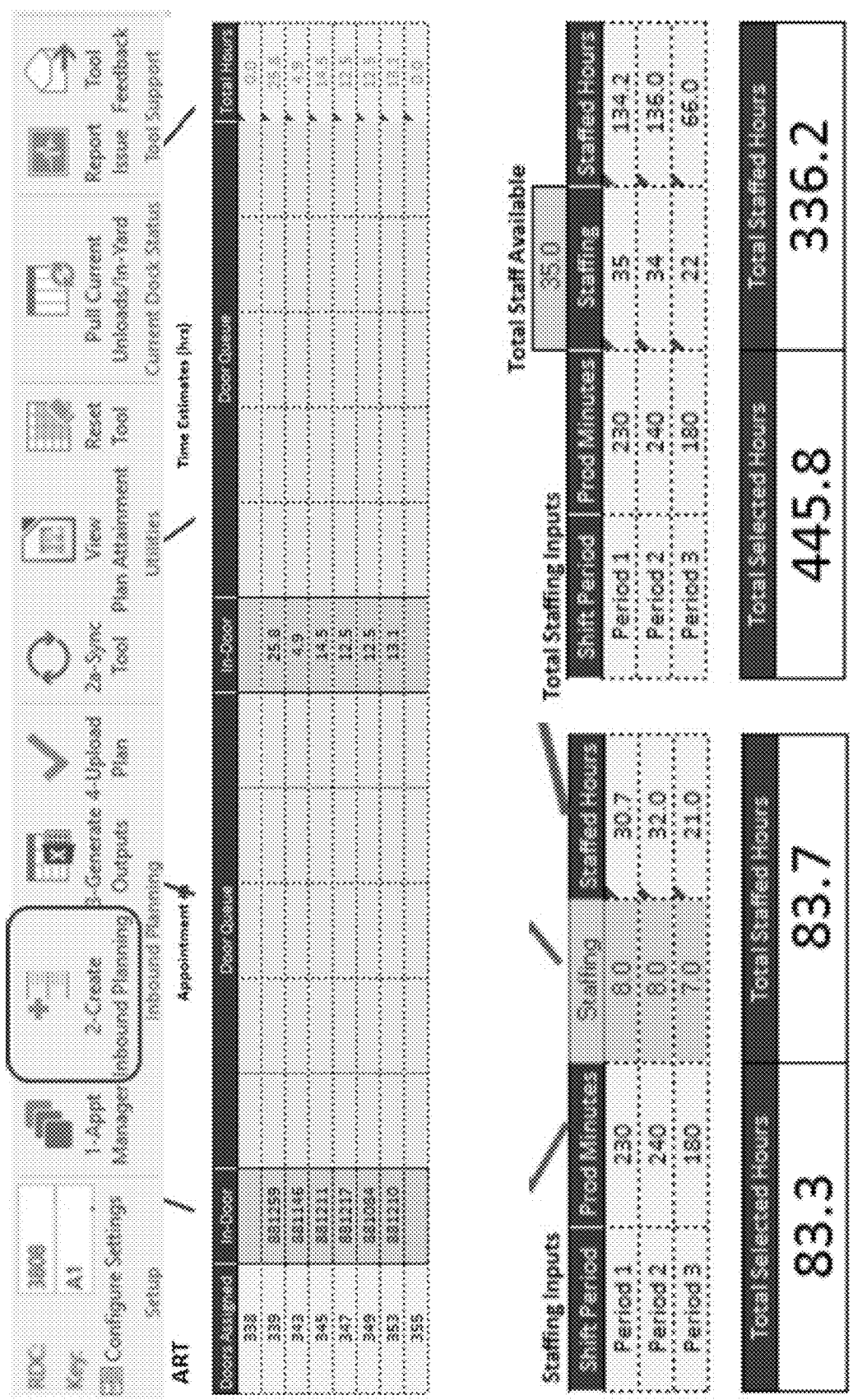

FIG. 6D, for example, shows a portion of the receiving plan creation user interface that can be used to receive user input that indicates resources to be applied to the tasks to be performed over the shift for the receiving process. In the present example, the portion of the receiving plan creation user interface can be presented in response to a user selecting a "Create Inbound Planning" control, and can be used to provide zone/door-level information for appointments in a queue, along with an amount of processing time expected per appointment, and a staffing level for the appointment. A zone/door combination, for example, can provide details related to a live/open/queue appointment based on selections made in the portion of the receiving plan creation user interface used for generating the list of inbound appointments (e.g., shown in FIGS. 6A-C). In the present example, a first section of the receiving plan creation user interface can display Appointment IDs, and a second section of the receiving plan creation user interface can display Time Estimates for various selected inbound appointments. A "Doors Assigned" column, for example, can show an identifier of an assigned door for an appointment. An "In-Door" column in the first section of the receiving plan creation user interface, for example, can show an Appointment ID for an appointment with an "Open/Queue" status. The "Door Queue" columns in the first section of the receiving plan creation user interface, for example, can show Appointment IDs for "Live" appointments, based on zone/door allocation. An "In-Door" column and the "Door Queue" columns in the second section of the receiving plan creation user interface, for example, can show an estimated time of completion for each respective appointment shown in the first section of the interface, based on historical productivity information. A "Total Hours" column in the receiving plan creation user interface, for example, can show a total estimated time for successfully completing all appointments for an assigned door, which can be met by allocating staffing resources.

In the present example shown in FIG. 6D, a staffing inputs control can be provided for allocating staffing resources for various periods of a shift. Based on a specified period assigned in a Shift Period Configuration (e.g., described in further detail with respect to FIG. 8B), for example, Productive Minutes can be determined for a respective period. A "Shift Period" column, for example, can show a period of a shift. A "Productive Minutes" column, for example, can show a total amount of productive minutes available per period, based on inputs to the Shift Period Configuration. User input can be provided under a "Staffing" column, for example, to indicate a total number of resources (e.g., workers) allocated per period. A "Staffed Hours" column, for example, can be calculated based on the Productive Minutes and the number input in the Staffing column, which results in a total number of staffed hours. The total number of staffed hours can match with Total Selected Hours, for example, to match 100% carton processing for a shift.

In the present example shown in FIG. 6D, a total staffing inputs control can be provided to indicate a total number of resources available during a shift. For example, user input can be provided in a "Total Staff Available" control to indicate a total number of resources (e.g., workers) available to the receiving team 120a. The resources allocated for each time period, for example, can be summarized based on the staffing inputs provided for each zone-period. If the "Total Staff Available" is less than the allocated staffing, for example, a visual notification (e.g., a highlight) can be provided, which indicates that resources should be reallocated.

Figure 6E:
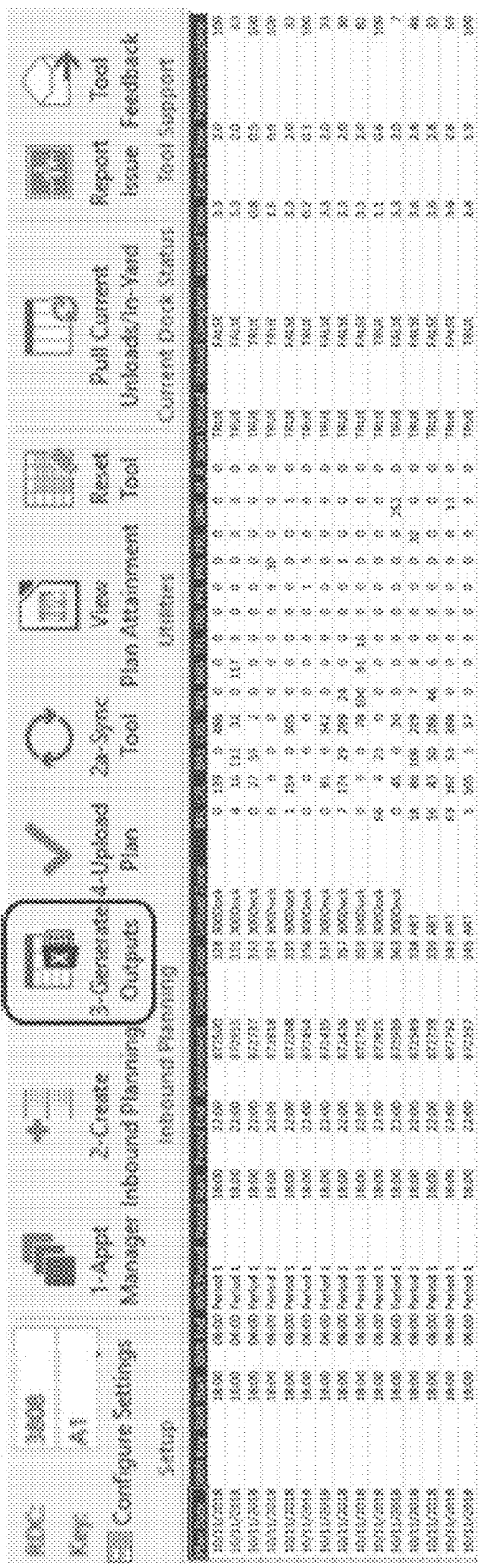

FIG. 6E, for example, shows a portion of the receiving plan creation user interface that can be used to present simulation output data based on a simulation of the tasks to be performed. Based on the previously input carton volumes and staffing allocations, for example, simulation output data can be generated (e.g., in response to a user selecting a "Generate Outputs" control) that provides projected volume per appointment. In the present example, details can be provided on appointment completion, which users can review for appointments having a value in an "Unload Complete" being marked as "True." If an appointment is not projected as being worked on according to the simulation results, for example, the appointment will have a value of "False" in a "Start Unload" column. Based on an amount of selected hours (e.g., as shown in an "Unload Time" column), for example, a number of hours that an appointment took to complete can be provided (e.g., as shown in an "Earned Time" column).

Figure 6F:
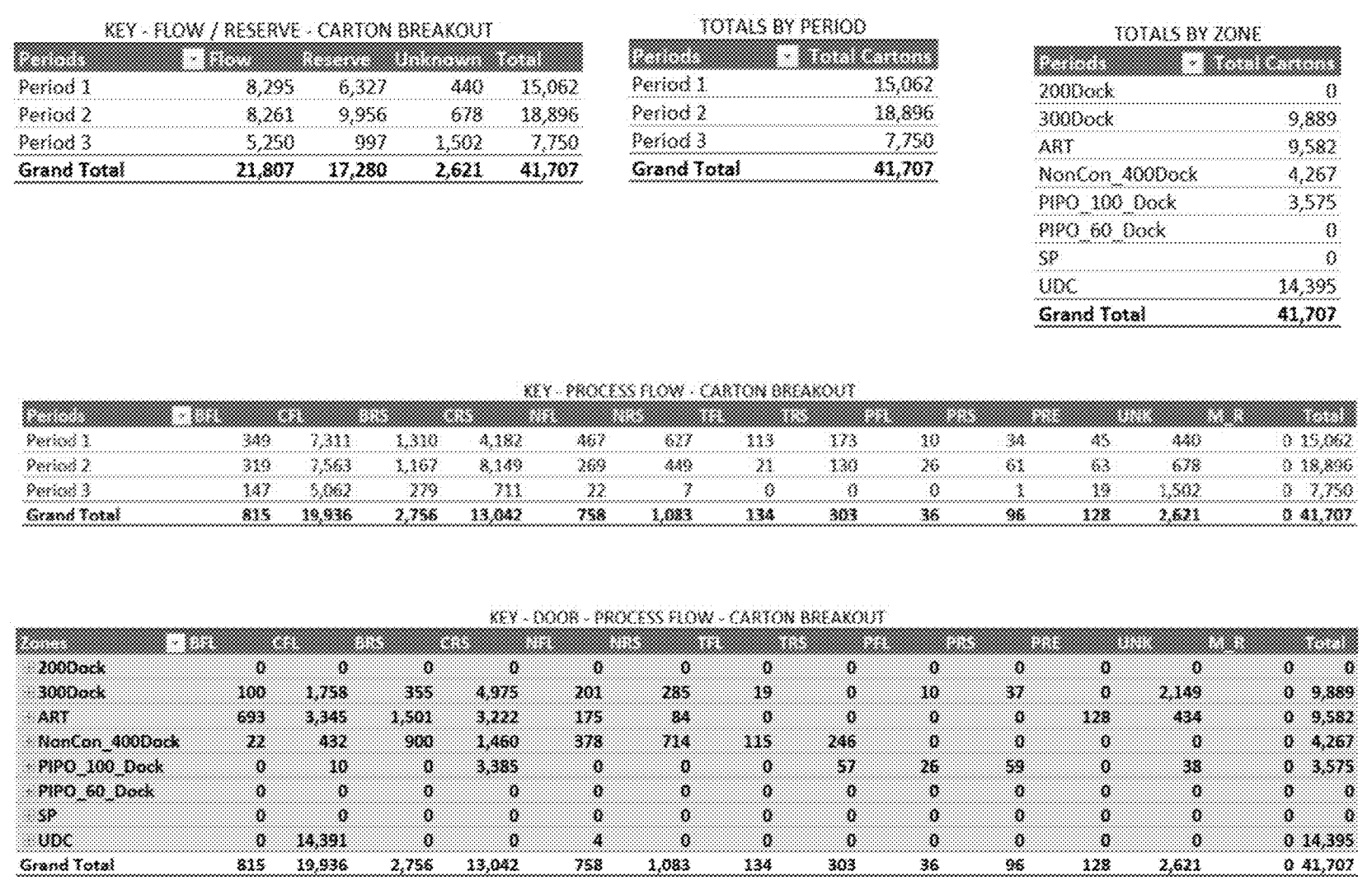

FIG. 6F, for example, shows summary information that can be provided with respect to the simulation output data (e.g., shown in FIG. 6E). In the present example, the summary information includes a "Key Flow/Reserve Carton Breakout" table, a "Totals By Period" table, a "Key Process Flow Carton Breakout" table, a "Key Door Process Flow Carton Breakout" table, and a "Totals By Zone" table. Each of the tables can be used by an operations manager, for example, to analyze, validate, and make decisions for a shift. The "Key Flow/Reserve Carton Breakout" table, for example, can be a pivot table that includes, by period, a total amount of carton processing information for Flow, Reserve, and Unknown processes. The "Totals By Period" table, for example, can include a summary of an entire plan prepared for a key, broken down by period. The "Key Process Flow Carton Breakout" table, for example, can be a pivot table that is generated for users to provide high-level carton processing at a period level. The table can provide directional numbers for users to understand the volumes to be processed, and to take action based on a business/operation case. The "Key Door Process Flow Carton Breakout" table, for example, can be a pivot table that provides a greater level of detail to check an amount of carton processing at the door level. The "Totals By Zone" table, for example, can summarize the total number of cartons processed by each zone.

Referring again to FIG. 6D, for example, once the simulation output data has been confirmed, receiving plan can be uploaded (e.g., in response to a user selecting an "Upload Plan" control) and stored. Details to be stored include, for example, Appointment Selection details, Inbound Planning details, and Planning Output. The Appointment Selection details, for example, can include live and drop appointments, along with the details provided in the portion of the receiving plan creation user interface used to generate the list of inbound appointments, such as vendor details, process flow breakup, and so forth. The Inbound Planning details, for example, can include "Staffing Inputs" provided in the portion of the receiving plan creation user interface used to receive indications of resources to be applied to the tasks to be performed over the shift for the receiving process (e.g., a number of allocated resources based on zone/period). The Planning Output, for example, can include some or all of the simulation output shown in FIG. 6E. In the present example, a number of cartons that are projected to be processed based on the receiving plan can be used as a data point to determine a number of pallets that are available to be processed by a downstream team (e.g., the storage and retrieval team 120b).

Referring now to FIGS. 7A-K, example storage and retrieval plan creation user interfaces (and/or portions of user interfaces) are shown. In general, the storage and retrieval plan creation user interface(s) can be used to evaluate staffing needs of multiple warehouse department functions, including putting reserve freight into locations, pulling full case freight out of locations, and moving freight through a warehouse or distribution center. The storage and retrieval plan creation user interface(s) can assist operation managers in allocating staffing resources such that high productivity and accuracy are maintained, for example.

Figure 7A:
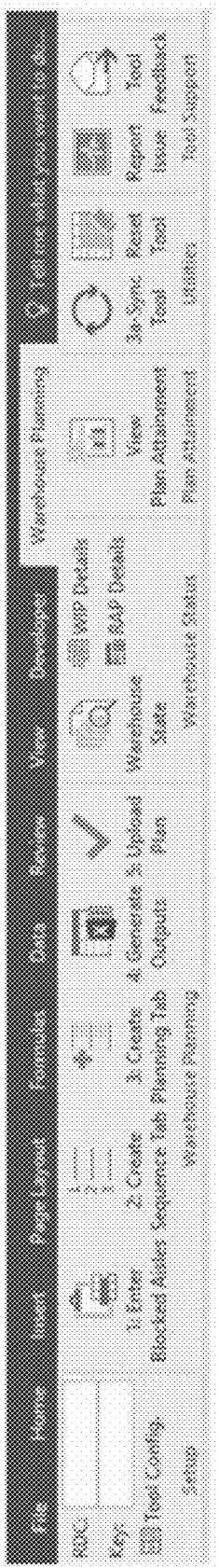

FIG. 7A, for example, shows a series of controls used to sequentially present portions of a storage and retrieval plan creation user interface, such that a user of the interface is guided through stages for generating storage and retrieval process plans. In the present example, the series of controls includes an "Enter Blocked Aisles" control, a "Create Sequence" control, a "Create Planning" control, a "Generate Output" control, and an "Upload Plan" control.

Figure 7B:
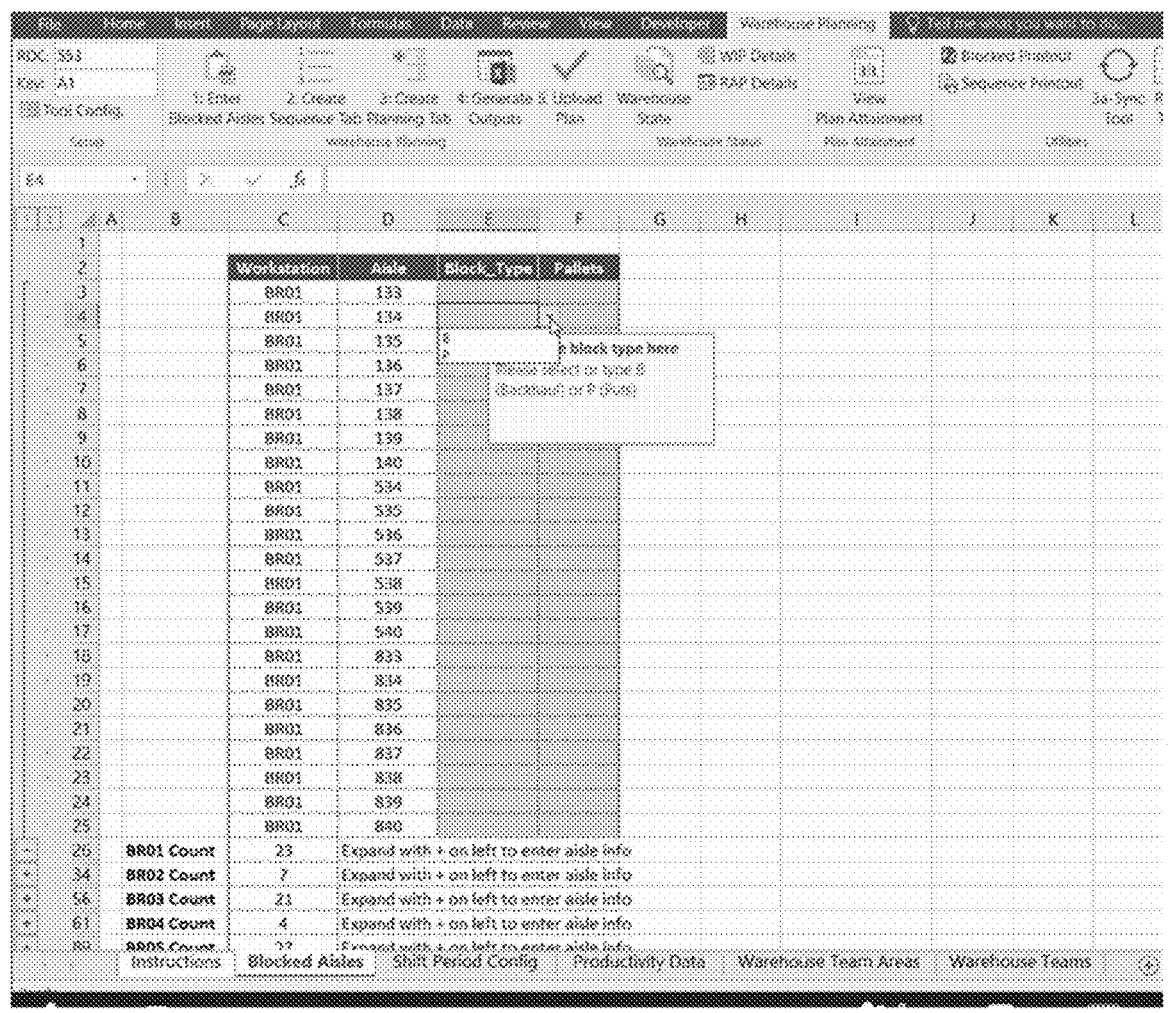

FIG. 7B, for example, shows a portion of the storage and retrieval plan creation user interface that can be used to receive user input that indicates a configuration of a warehouse environment as it applies to storage and retrieval operations. For example, in response to a user selecting the "Enter Blocked Aisles" control (shown in FIG. 7A), a portion of the storage and retrieval plan creation user interface for entering information about blocked aisles can be presented to the user. In general, the blocked aisles interface can provide a list of workstations (e.g., as shown in a "Workstation" column) and aisles (e.g., as shown in an "Aisle" column) that are being physically blocked. If an aisle is blocked, for example, some operations may not be able to be performed in the aisle, such as operations that involve powered equipment. Such aisle blockage information may not be tracked by a warehouse management system (e.g., the warehouse management system(s) 220, shown in FIG. 2), for example, but may be used in a simulation of storage and retrieval processes. Workstations, for example, can be a high-level grouping of aisles (e.g., including storage racks 112) in the warehouse environment 100. The workstations, for example, can be grouped by a type of goods stored in the area, because different types of goods may be stored using different types of storage racking, or because of various regulations (e.g., food items being stored separately from other types of goods). In the present example, a user of the blocked aisle portion of the storage and retrieval plan creation user interface can provide input about blocked aisles under a "Block Type" column, and under a "Pallets" column. A "Block Type" control, for example, can be used to input either a "Backhaul (B)" or "Puts (P)" type of blockage in a particular Workstation/Aisle. A "Pallets" control, for example, can be used to input a number of pallets being processed in the particular Workstation/Aisle.

Figure 7C:
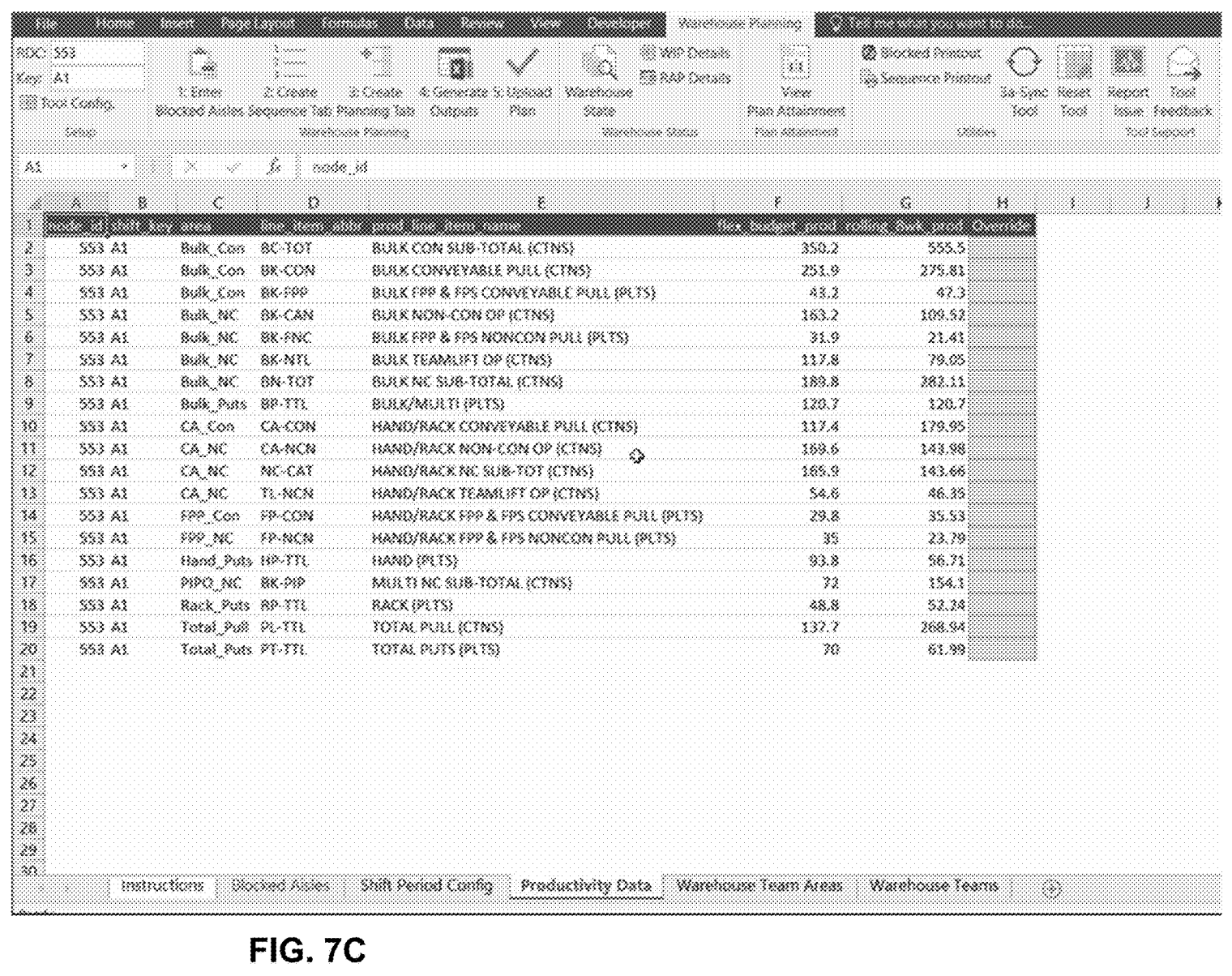

FIG. 7C, for example, shows another portion of the storage and retrieval plan creation user interface that can be used to receive user input that indicates a configuration of a warehouse environment as it applies to storage and retrieval operations. For example, in response to a user selecting a "Productivity Data" control, a portion of the storage and retrieval plan creation user interface related to productivity data can be presented to the user. In general, the productivity data can map locations of a warehouse to various teams, and can be based on Area-Process Flow for a selected Shift Key. The productivity data, for example, can include Flex Budget Productivity and Rolling Eight Week Productivity averages (e.g., based on recent historical trends). In the present example, a user of the productivity data portion of the storage and retrieval plan creation user interface can override productivity numbers (e.g., in case the numbers are inflated/deflated), by providing an updated value under an "Override" column.

Figure 7D:
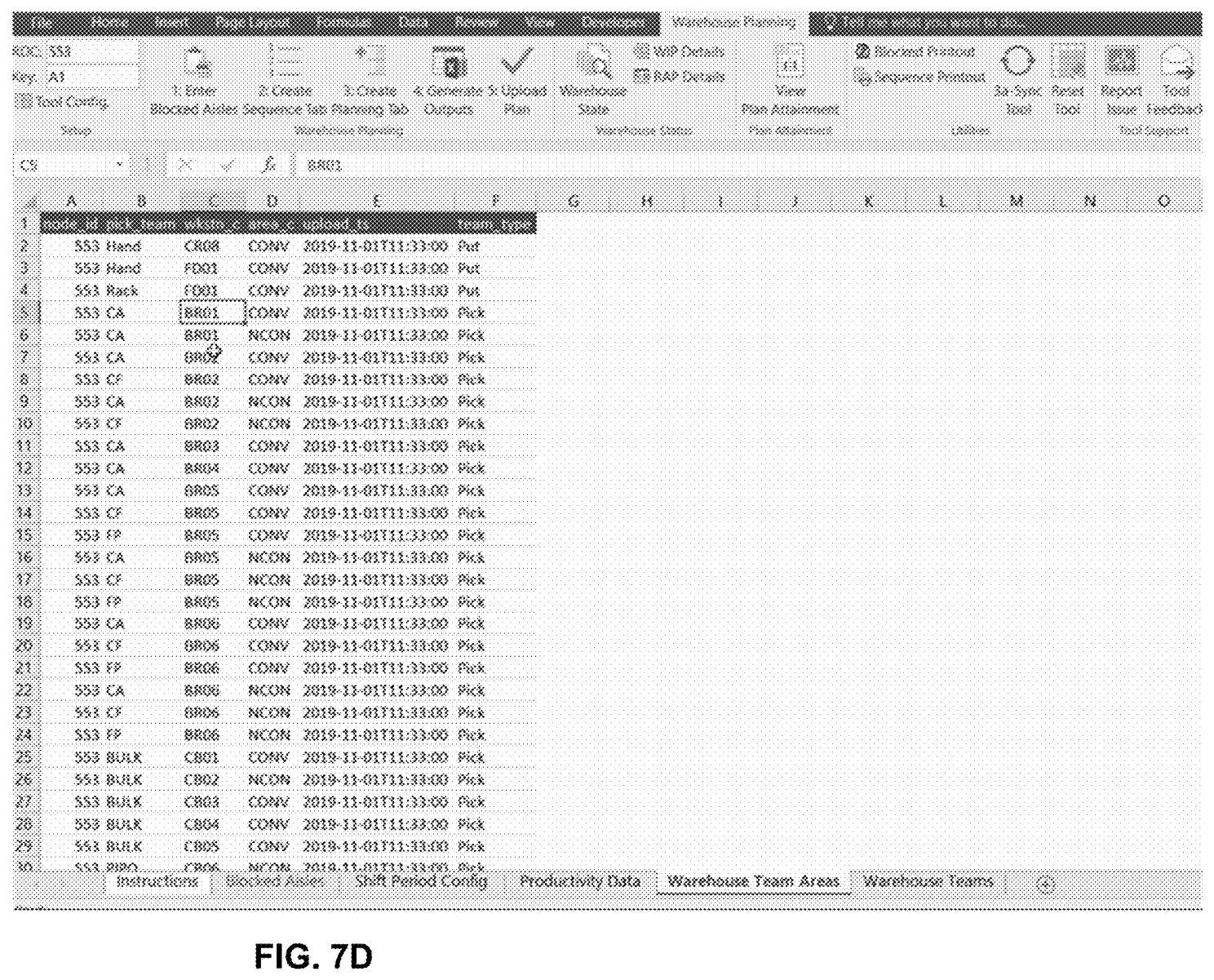

FIG. 7D, for example, shows another portion of the storage and retrieval plan creation user interface that can be used to receive user input that indicates a configuration of a warehouse environment as it applies to storage and retrieval operations. For example, in response to a user selecting a "Warehouse Team Areas" control, a portion of the storage and retrieval plan creation user interface related to storage and retrieval team areas can be presented to the user. In general, particular workstations can be mapped to particular types of work, and thus to particular types of teams. The storage and retrieval team areas interface, for example, can include a consolidated list of Workstation IDs and Area Codes, based on team type. Area Codes, for example, include conveyable (e.g., eligible for automated conveyer and sorter systems) and non-conveyable (e.g., large, bulky, and or breakable items) designations.

Figure 7E:
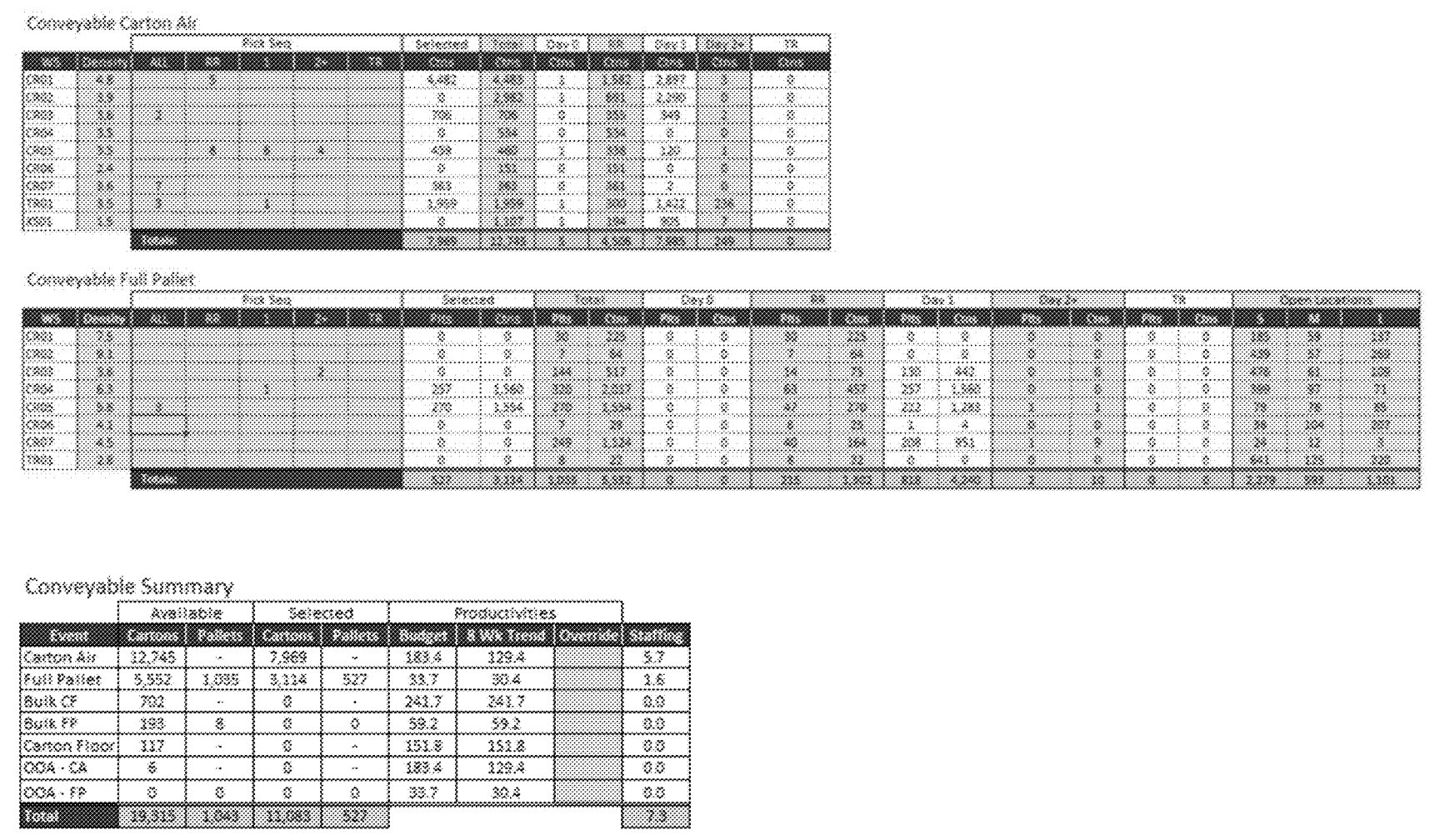

FIG. 7E, for example, shows a portion of the storage and retrieval plan creation user interface that can be used to receive user input that indicates a sequence of tasks to be performed over a shift for the storage and retrieval processes. For example, after warehouse configuration information has been provided (e.g., using one or more portions of the storage and retrieval plan creation interface shown in FIGS. 7B, 7C, and/or 7D), and in response to a user selecting the "Create Sequence" control (shown in FIG. 7A), a sequencing portion of the storage and retrieval plan creation user interface can be presented to the user. To initiate a sequencing of workstations for an upcoming shift, for example, the sequencing portion of the storage and retrieval plan creation user interface can provide details on Conveyable Carton Picks for Conveyable Carton Air and Conveyable Full Pallet items. Columns in the respective Conveyable Carton Air and Conveyable Full Pallet tables include various columns that show values for various workstations, for example, and can receive user input that indicates a pick sequence. A "Workstation" column, for example, can show workstations allocated to a respective process/team. A "Density" column, for example, can be calculated based on Total Capacity/Total Units. A series of "Pick Sequence" columns, for example, can include controls for receiving user input that indicates a pick sequence for the various workstations. A "Selected" column, for example, can summarize a total planned quantity which is selected by the user based on the indicated pick sequence. A "Total" column, for example, can show a Total Carton Quantity that is to be processed, taking backlogs into account. A "Day 0" column, for example, can show a current day's backlog. A "RR" column, for example, can show a total quantity for Rapid Replenishment. A "Day 1" column, for example, can show yesterday's backlog. A "Day 2+" column, for example, can show a backlog that has aged for two days or more. A "TR" column, for example, can show a Total Quantity for Transition. For pallet process flow, for example, quantities may be broken down at Pallet and Total Carton level. As shown in the Conveyable Full Pallet table, for example, each of the "Selected," "Total," "Day 0," "RR," "Day 1," "Day 2+," and "TR" columns includes a "Pallet" column and a "Cartons" column. The "Pallet" column, for example, can indicate a total number of pallets that are requested to be picked from the respective workstation. The "Cartons" column, for example, can indicate a total number of cartons that are requested to be picked from the respective workstation.

In general, sequence creation may be based on business operations of particular warehouse environments. For example, users can ensure that backlog quantities and a current day's incoming volume are processed based on available resources. To provide an example of sequencing logic, for Conveyable Full Pallet, based on the Total Carton volume, CR03, CR04 and CR05 can be selected to generate the Pick Volume. For selected workstation CR04, for example, Day 1 can be selected under the Pick Sequence columns (e.g., by inputting Pick Sequence 1), which indicates that all pick requested quantities which are in backlog and have been aging for 1 day or more (including TR) can be worked by the team. In the present example, this means that Pallet Quantities of Day 1 (e.g., 257), Day 2+(e.g., 0) and TR (e.g., 0) total 257 Pallets or 1,560 cartons. Moving on to another selected workstation, for example, CR03 has been selected to be sequenced under 2+ days (e.g., any volume that is in backlog for 2+ days, including TR). In the present example, the total volume selected for this workstation is 0 as there is no volume for the assigned days. The volume can be verified based on the "Selected" column, for example, which provides total volume selected based on the sequence. Therefore, in the present example, Pick Sequence 2 should not be selected for CR03 for the shift. In addition, the total number of available locations for the workstations based on the size(s) can be provided under the "Open Location" column, for example. Users can pick and choose to work on backlogs, for example, and then return back to a current incoming backlog. Each time a sequence is selected, for example, the sequencing portion of the storage and retrieval plan creation interface can summarize the Total Quantity and provide high-level overview information.

Referring to a Conveyable Summary table (shown in FIG. 7E) included in the sequencing portion of the storage and retrieval plan creation user interface, for example, a high-level overview of the selected volume is provided, along with expected labor quantities. An "Available" column, for example, can show a total volume that is available to be processed (e.g., broken down by total Cartons and Pallets). A "Selected" column, for example, can show a total volume that is selected by the user during a sequencing process (e.g., broken down by total Cartons and Pallets). A "Budget" column, for example, can show a selected volume for each process line type divided by a current month's budget for the process line type. A "Trend" column, for example, can show a team's performance to budget over a recent number of weeks (4 weeks, 8 weeks, 12 weeks, or another suitable number of weeks). User input can be provided under an "Override" column, for example, to modify productivity based on an estimation. For example, a value entered under the "Override" column can be a number that is entered for Pull, Pick, or both. A "Staffing" column, for example, can show selected volume divided by planned productivity, divided by hours in a shift.

Figure 7F:
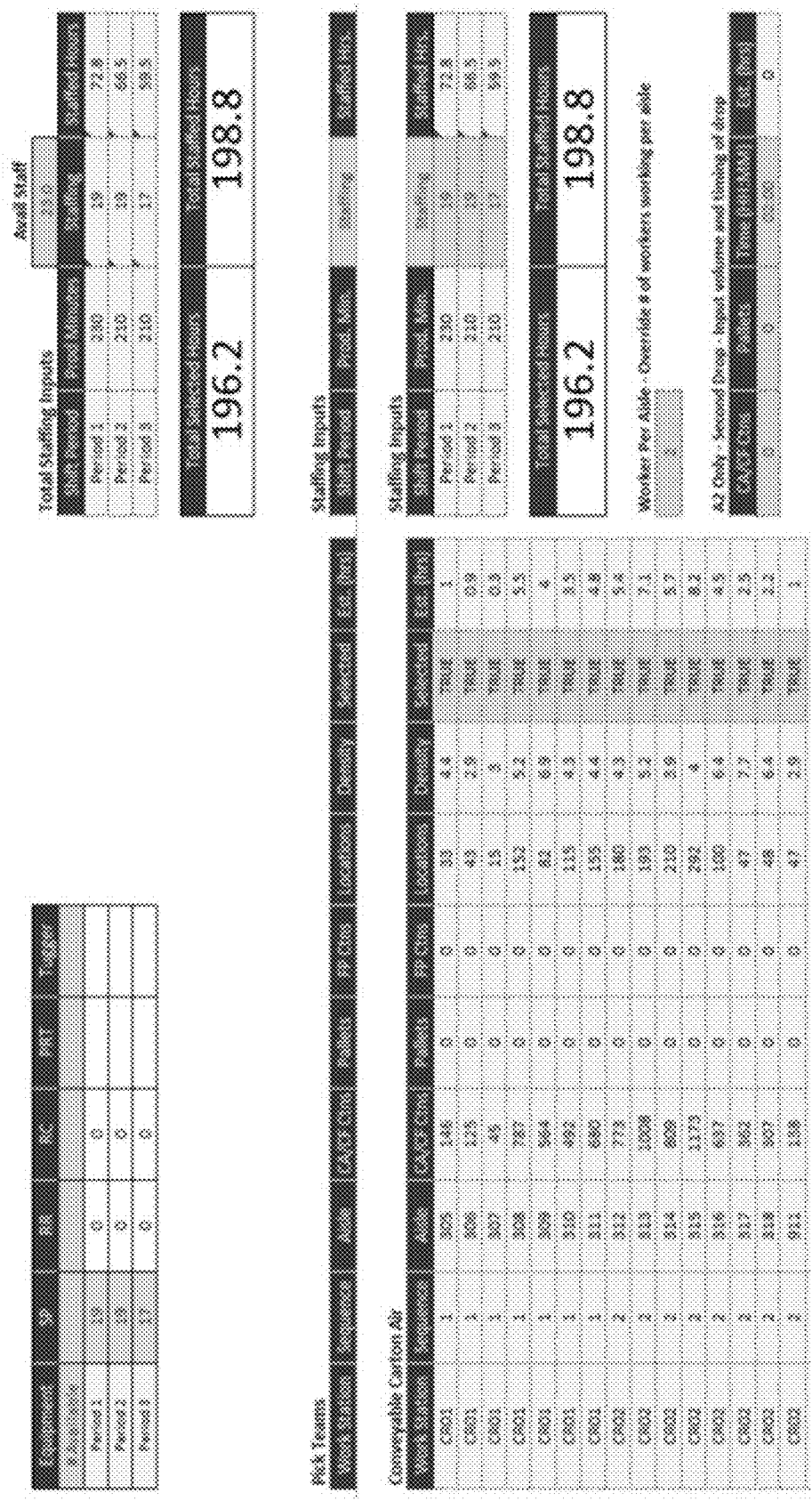

FIG. 7F, for example, shows a portion of the storage and retrieval plan creation user interface that can be used to receive user input that indicates resources to be applied to the tasks to be performed over the shift for the storage and retrieval processes. For example, after task selection and sequencing information has been provided (e.g., using one or more portions of the sequencing portion of the storage and retrieval plan creation user interface shown in FIG. 7E), and in response to the user selecting the "Create Planning" control (shown in FIG. 7A), a resource application portion of the storage and retrieval plan creation user interface can be presented to the user. The resource application portion of the storage and retrieval plan creation user interface, for example, can include details related to a selected process team (e.g., a pick team that retrieves goods from a warehouse, a put team that stores goods in the warehouse, etc.) and a warehouse area (e.g., one or more workstations and/or aisles) to which the selected process team has been assigned. Based on a breakout (e.g., an aisle), for example, total carton volume can be available in addition to a total number of pallets that have been requested to be processed (e.g., picked, put, etc.). In the present example, a Conveyable Carton Air table is shown for providing details for one or more pick teams that were previously selected using the sequencing portion of the storage and retrieval plan creation user interface. A "Workstation" column, for example, can show workstations selected by the user using the sequencing portion of the interface. A "Sequence" column, for example, can organize the workstations based on the sequencing order selected by the user for the respective team. An "Aisle" column, for example, can show an aisle number of the workstation. A "CA/CF Cartons" column, for example, can show total conveyable cartons volume. A "Pallets" column, for example, can show a total number of pallets requested to be picked from the aisle. A "PA Cartons" column, for example, can show a total number of full pallet cartons requested to be picked from the aisle. A "Locations" column, for example, can show a total number of locations from which a carton/pallet is to be picked. A "Density" column, for example, can be calculated based on Total Capacity/Total Units. An "Estimated Hours" column, for example, can show a number of hours for completing a pick request based on productivity for a retrieval process.

In the present example shown in FIG. 7F, a Staffing Inputs table can also be provided. Based on a RDC (Regional Distribution Center) specified period assigned in a "Shift Period Configuration," for example, "Productive Minutes" can be determined for various different periods. User input can be provided under a "Staffing" column to allocate resources (e.g., workers) to the sequenced tasks, which can in turn update values under the "Staffed Hours" column. If the total number of "Staffed Hours" matches the "Total Selected Hours," for example, 100% of the volume processing may be accounted for during the shift.

In the present example shown in FIG. 7F, a Total Staffing Inputs table can also be provided to present staffing overview information for an entire retrieval plan, based on the staffing provided for each of the pick teams. User input can be provided in an "Available Staff" control to indicate a total number of available workers for a shift. For a given period, if an allocation exceeds the Available Staff, for example, an indication of the error can be provided (e.g., by highlighting one or more values).

In the present example shown in FIG. 7F, a Workers Per Aisle control can be provided, through which a user can input a number of workers to be allocated to each aisle. For example, more than one worker can be assigned to each aisle to facilitate faster warehouse processing. The value provided using the Workers Per Aisle control can impact a simulation of the storage and retrieval operations, for example.

In the present example shown in FIG. 7F, an Equipment table can also be provided to ensure that a total number of resources available during a shift is considered during a plan creation process. Based on a type of warehouse equipment used to move cartons/pallets (e.g., as indicated by values for SP (Stock Picker), RR (Reach Rider), RC (Rider Counterbalance), PRT (Pallet Rider Triple), and Tugger), for example, a total number of equipment items available to a shift can be input before assigning staffing values for pick teams. In the present example, a storage and retrieval plan can be created with 6 SPs and 5 RRs assigned for a key. Based on the storage and retrieval plan, for example, if total staffing exceeds available equipment, an indication can be provided through the Equipment table (e.g., by highlighting one or more values), prompting an operations manager to reassess a staffing allocation.

FIG. 7G, for example, shows a RAPs (Received Awaiting Putaway) Overview Table that can be provided for presenting details related to a total number of pallets that have been received and are to be put away. Aging intervals of 2 hours each, from 0 to 24 hours, for example, can be generated and broken down based on pallet processing (e.g., Rack, Hand, Bulk or Multi). Information provided in the RAPs Overview table can be used later, for example, along with estimated pallet information from the receiving plan creation user interface.

Figure 7H:
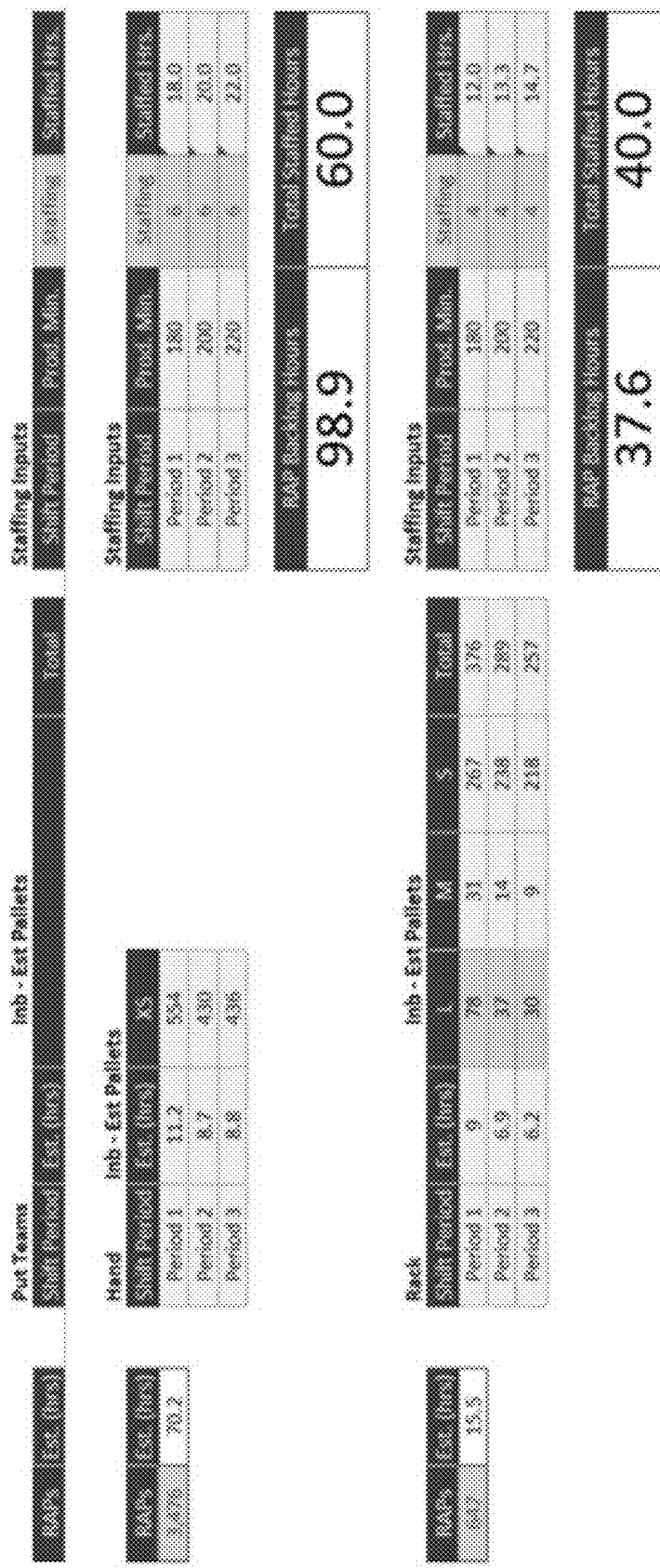
Figure 71:
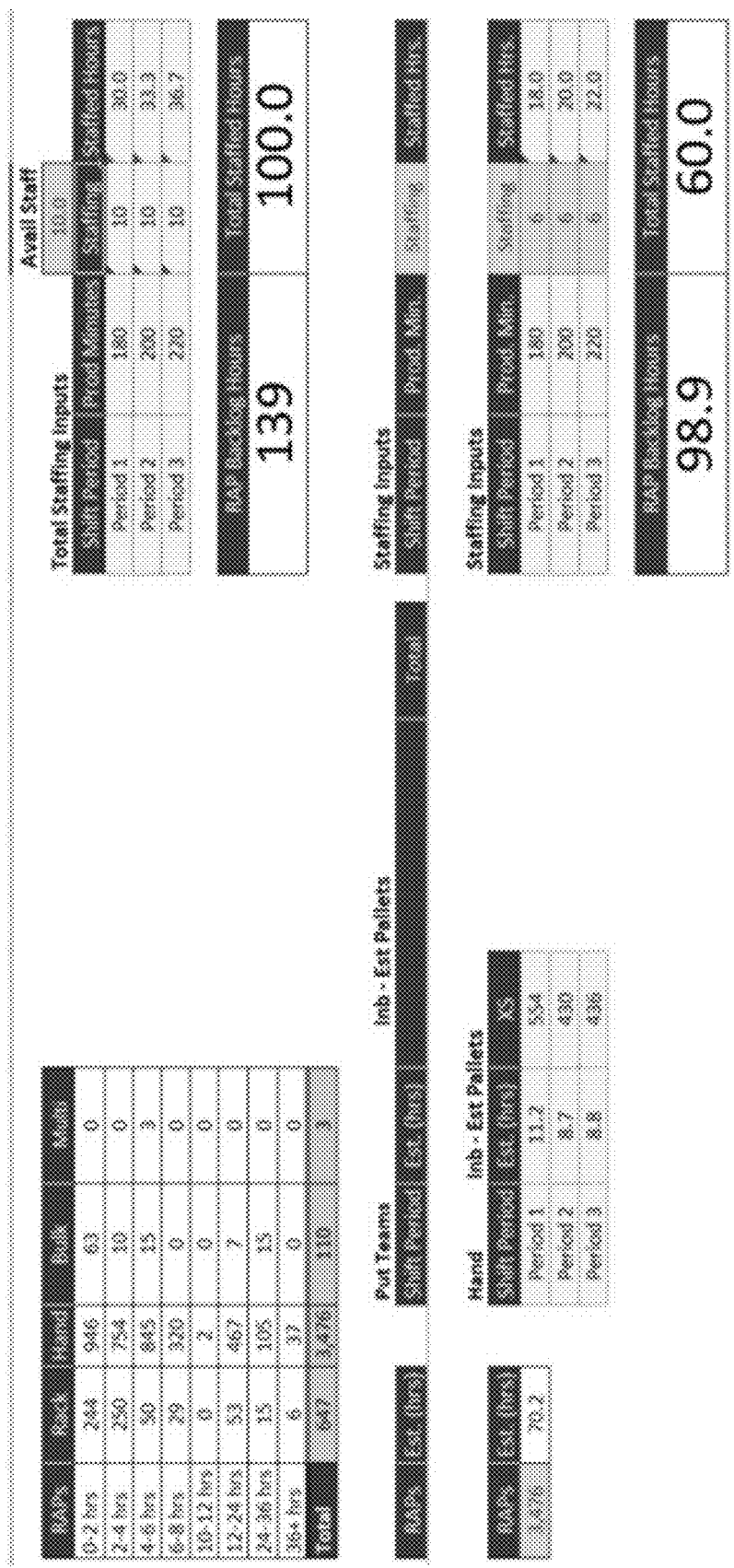

FIG. 7H, for example, shows a receiving plan import interface for importing data from the receiving plan for use in creating a storage and retrieval plan. For example, input can be received from the receiving plan for a given shift to evaluate the estimated incoming pallet quantities that can be processed by one or more storage and retrieval teams. If the receiving plan is not uploaded, for example, a message can be presented prompting for upload of the receiving plan. The receiving plan import interface can include a Put Teams table, for example, that shows a volume of Large, Medium, or Small Pallets that can be processed for a given period. A number of periods may vary, for example, based on a particular warehouse environment. A carton-to-pallet algorithm can be used to covert a total number of cartons (e.g., from an incoming appointment) into a total number of pallets, for example. The receiving plan import interface can also provide a percentage of RAPs Pallet Quantities along with Estimated Hours, and along with a percentage breakout of Dock to Aisle %. Inbound Planning Estimated Pallets and RAPs Pallet Quantity can be considered to determine a put team's staffing levels, for example. Through the receiving plan import interface, for example, a user can manually adjust various values (e.g., RAP values, and/or staffing values) to more accurately reflect a total backlog of work available.

FIG. 7I, for example, shows a staffing inputs interface for use in creating a storage and retrieval plan. Based on a RDC specified period assigned in the "Shift Period Configuration," for example, "Productive Minutes" can be determined for a respective period. User input can be provided under a "Staffing" column to allocate resources (e.g., workers), which can in turn update values under a "Staffed Hours" column. If the total number of "Staffed Hours" matches the "Total Selected Hours," for example, 100% of the volume processing may be accounted for during the shift.

Figure 7J:
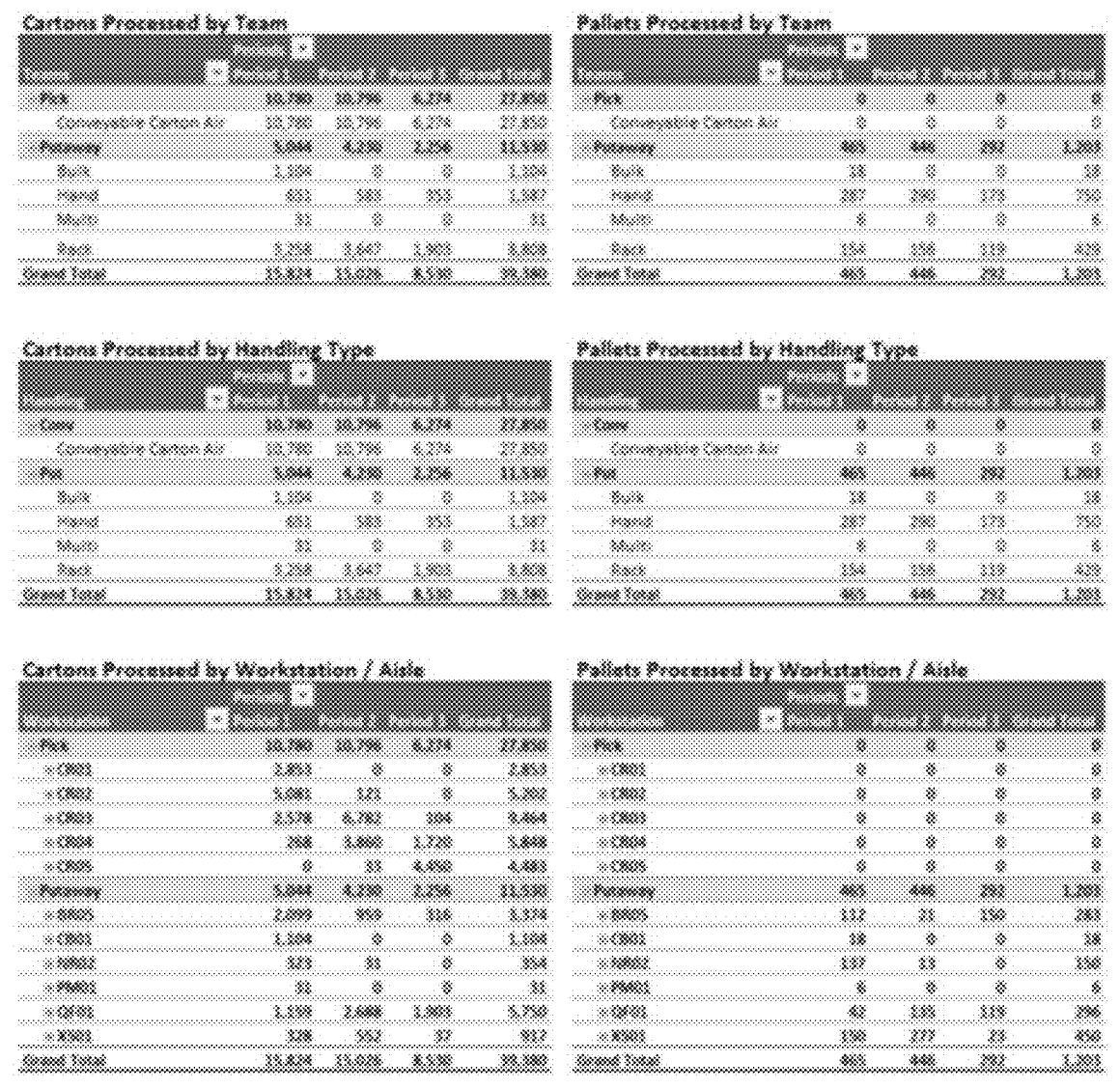
Figure 7K:
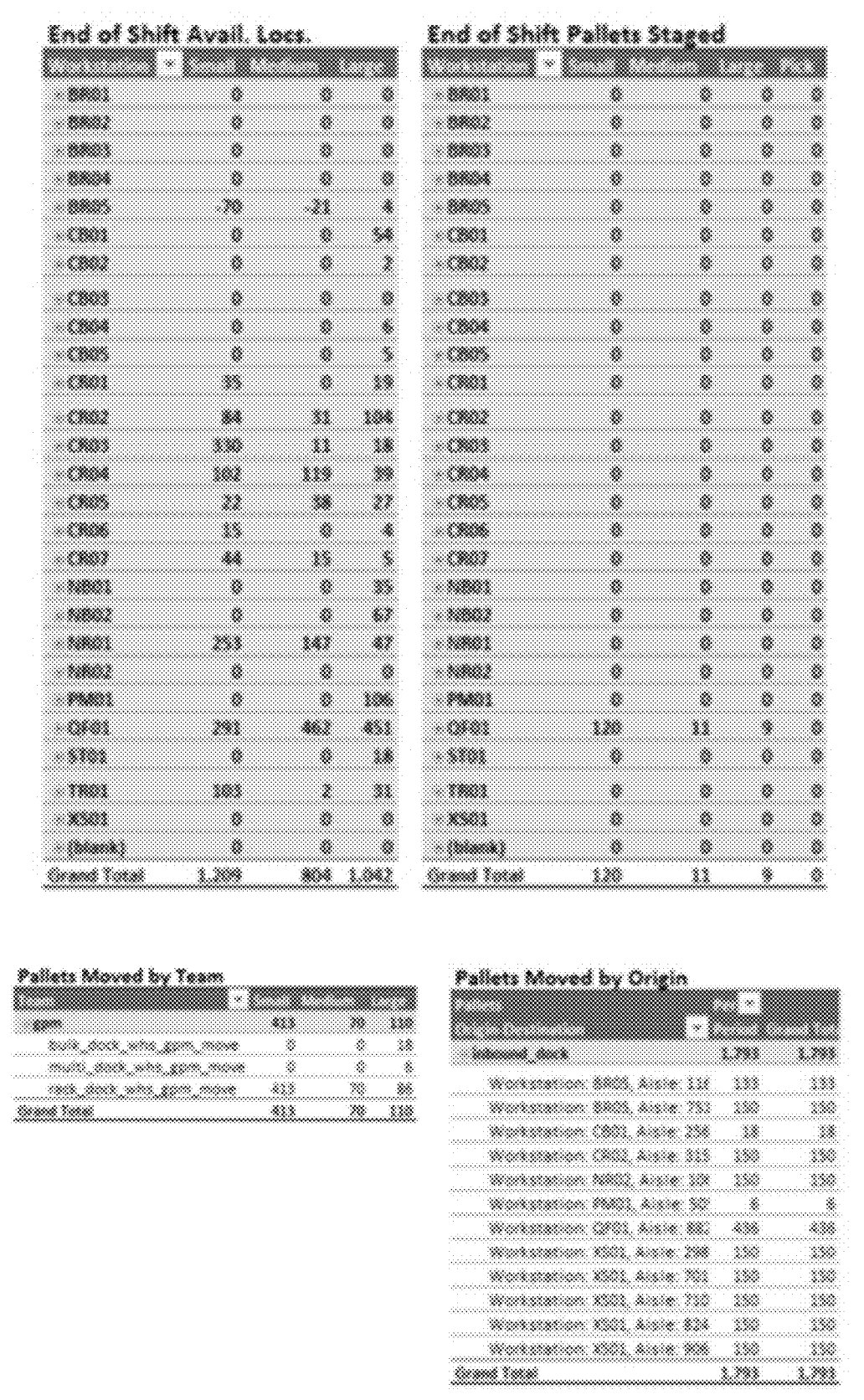

FIGS. 7J and 7K, for example, show summary information that can be provided with respect to simulation output data. For example, in response to the user selecting the "Generate Outputs" control (shown in FIG. 7A), simulated output can be generated based on data input using the warehouse configuration portion(s), the sequencing portion(s), and the resource application portion(s) of the storage and retrieval plan creation user interface. The simulated output can be used by an operations manager, for example, to analyze, validate, and make decisions for a shift. In the present example, the simulation output data for the storage and retrieval processes can include warehouse state data, pick/put data, and mover data. The warehouse state data, for example, can include data related to carton/pallet states in terms of total cartons and pallets that are unpicked, along with inventory age information. A density detail can be added for pending cartons and pallets, for example, to indicate a backlog that may be provided to a next shift. A total number of available locations can be provided for each aisle, based on size (e.g., small, medium, and large), for example, along with pending staged pallets. The pick/put data, for example, can provide details related to each pick and put team working on selected volumes based on the storage and retrieval plan. Breakout, for example, can be based on a team identifier and workstation. A total volume can be determined based on selected volumes and resource allocations, for example. A projected volume, for example, can be based on period available hours and productivity of a team, and can be determined for each aisle. Mover data, for example, can include output details for each trip identifier at a period level, to identify a total number of processed cartons, along with a size of a processed pallet, based on team type.

As shown in FIG. 7J, for example, a Cartons Processed by Team summary, a Pallets Processed by Team summary, a Cartons Processed by Handling Type summary, a Pallets Processed by Handling Type summary, a Cartons Processed by Workstation/Aisle summary, and a Pallets Processed by Workstation/Aisle summary can be provided. The Cartons Processed by Team summary and the Pallets Processed by Team summary, for example, can each be based on period and grand total, and can provide high-level storage and retrieval team volume information. The Cartons Processed by Handling Type summary, the Pallets Processed by Handling Type summary, the Cartons Processed by Workstation/Aisle summary, and the Pallets Processed by Workstation/Aisle summary for example, can each be based on period and grand totals.

As shown in FIG. 7K, for example, an End of Shift Available Location summary, an End of Shift Pallets Staged summary, a Total Pallets Moved by Team summary, and a Total Pallets Moved by Origin summary can be provided. The End of Shift Available Location summary, for example, can be based on aisle and size, and can be used for next key planning or identifying locations for particular focus. The End of Shift Pallets Stages summary, for example, can be based on aisle and size.

Referring again to FIG. 7A, for example, once the simulation output data for the storage and retrieval process simulation has been confirmed, a storage and retrieval plan can be uploaded (e.g., in response to a user selecting the "Upload Plan" control) and stored. Details to be stored include, for example, Warehouse Configuration details, Warehouse Planning details, and Planning Output. The Warehouse Configuration details can include, for example, information input by the user through the portion of the storage and retrieval plan creation user interface for entering information about blocked aisles (e.g., shown in FIG. 7B), information input by the user through the portion of the storage and retrieval plan creation user interface for entering information about warehouse productivity (e.g., shown in FIG. 7C), and/or information input by the user through the portion of the storage and retrieval plan creation user interface for entering information about storage and retrieval teams (e.g., shown in FIG. 7D). The Warehouse Planning details can include, for example, task sequencing information input by the user (e.g., information related to selected and sequenced workstations), and resource allocation information input by the user. The Planning Output, for example, can include some or all of the simulation output described with respect to FIGS. 7J and 7K.

Referring now to FIGS. 8A-D, example shipping plan creation user interfaces (and/or portions of user interfaces) are shown. In general, the shipping plan creation user interface(s) can be used to evaluate staffing levels based on multiple department functions, ranging from a current backlog of received/pulled and not diverted goods, outputs from daily shift department plans (e.g., a storage and retrieval plan), and volume to be sorted/built. The shipping plan creation user interface(s) can assist operation managers in allocating staffing resources such that high productivity and accuracy are maintained, for example.

Figure 8A:
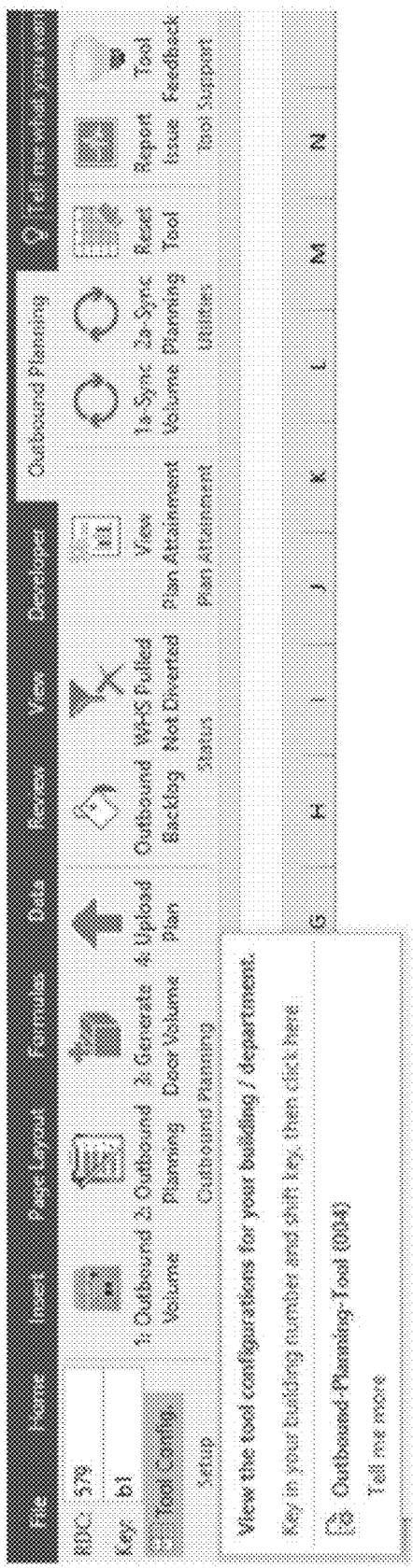

FIG. 8A, for example, shows a series of controls used to sequentially present portions of a shipping plan creation user interface, such that a user of the interface is guided through stages for generating a shipping process plan. In the present example, the series of controls includes a "Tool Configuration" control, an "Outbound Volume" control, an "Outbound Planning" control, a "Generate Door Volume" control, and an "Upload Plan" control.

Figure 8B:
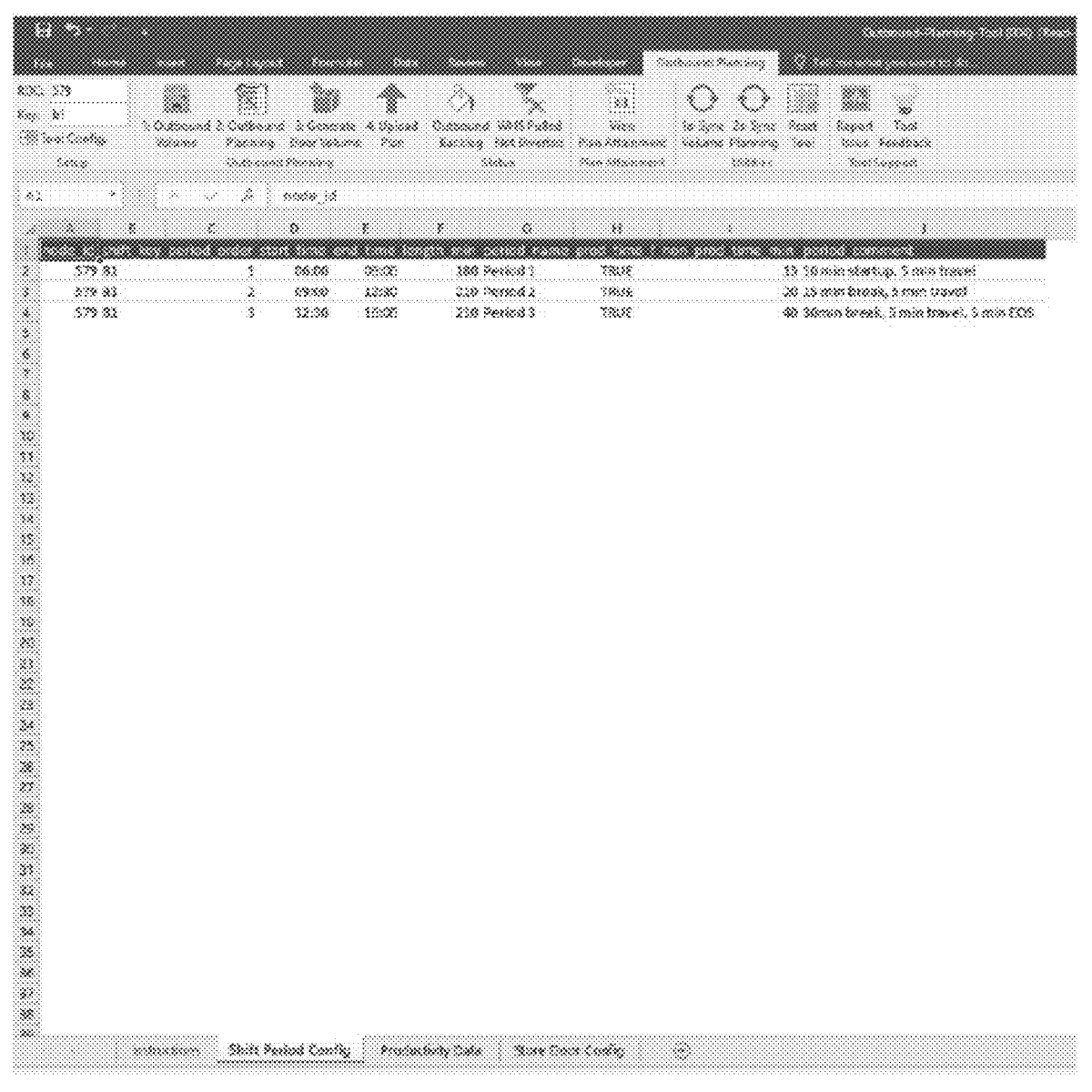
Figure 8C:
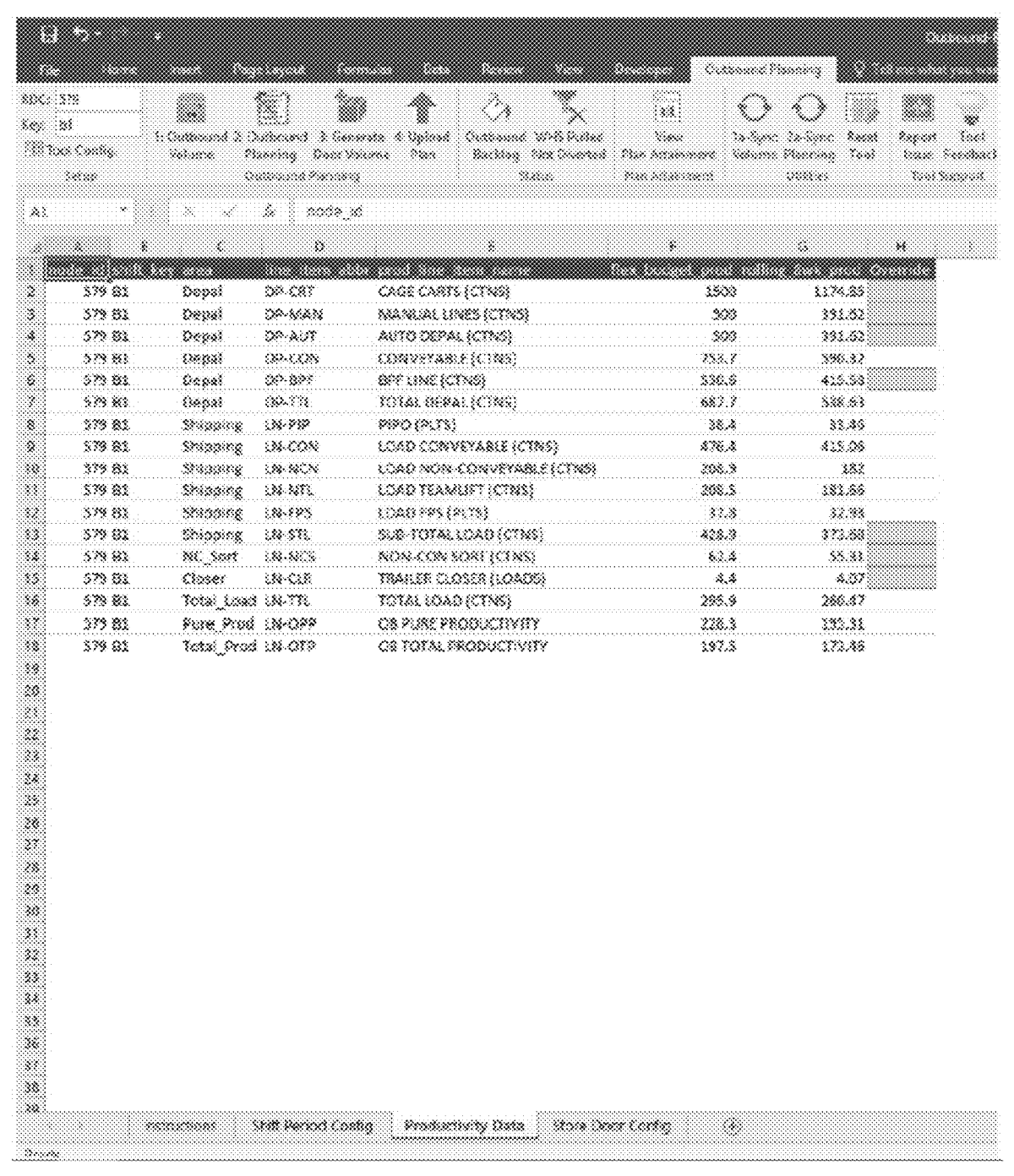
Figure 8D:
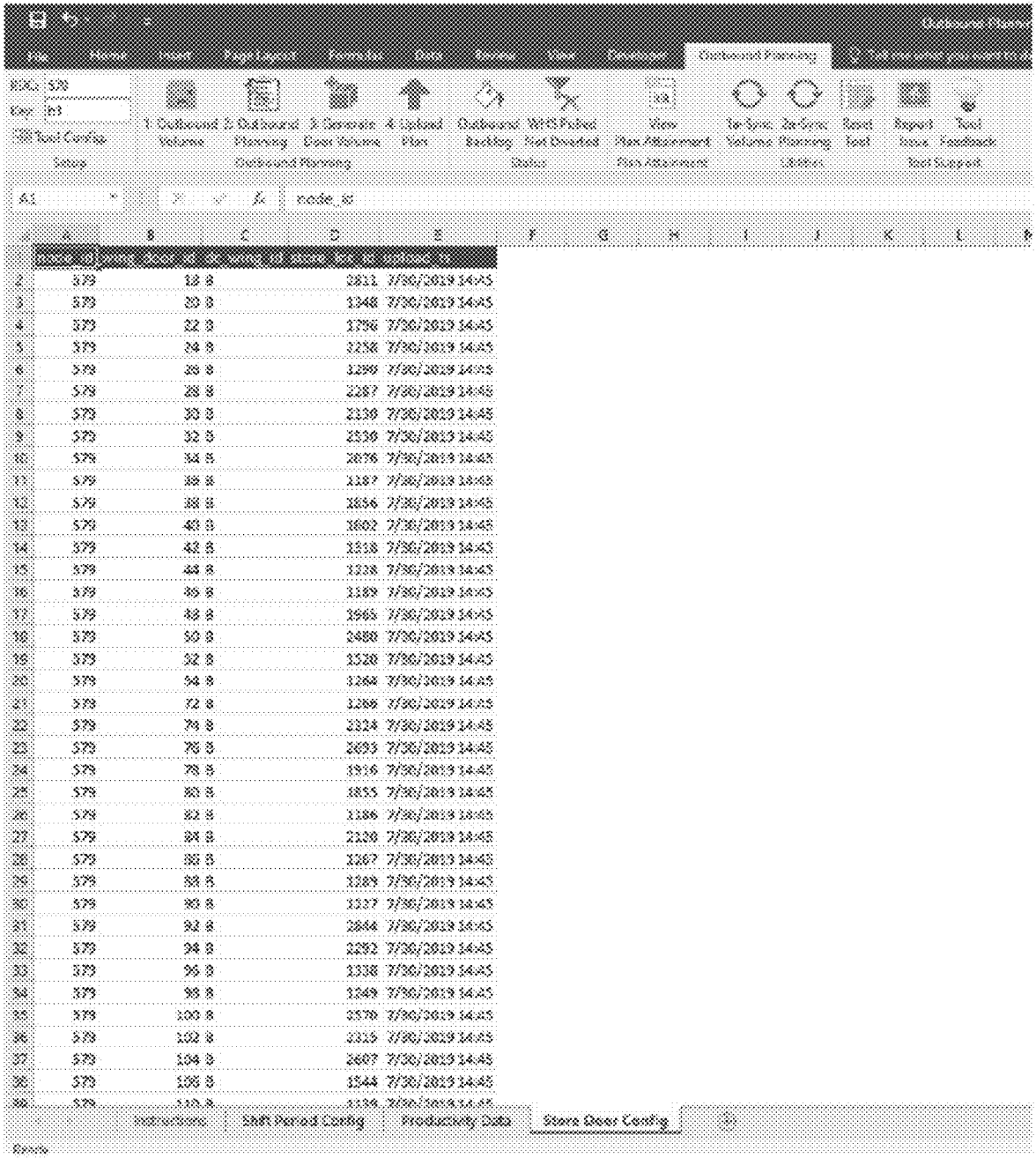

FIGS. 8B, 8C, and 8D, for example, each show a respective portion of the shipping plan creation user interface that can be used to receive user input that indicates a configuration of a warehouse environment. For example, in response to the user selecting the "Tool Configuration" control (shown in FIG. 8A), respective controls can be provided for navigating to a "Shift Configuration" interface, a "Productivity Data" interface, and a "Store Door Configuration" interface. In some implementations, other configuration interfaces may be provided through other plan creation user interfaces (e.g., receiving plan creation interfaces, storage and retrieval plan creation interfaces, and/or shipping plan creation interfaces), in addition to or instead of the configuration interfaces depicted herein.

As shown in FIG. 8B, for example, a portion of the shipping plan creation user interface for providing information about a Shift Period Configuration can be presented to the user. For example, the Shift Period Configuration can include a timing for each period of a shift, such that non-productive minutes are removed from available work minutes in the period. In the present example, if Period 1 runs for 180 minutes and 15 minutes of non-productive time are removed for startup and travel time, there will be 165 productive minutes available for work tasks.

As shown in FIG. 8C, for example, a portion of the shipping plan creation user interface for providing information related to Productivity Data can be presented to the user. For example, productivity data can be based on Area-Process Flow for a selected Key. Productivity data, for example, can be available at Flex Budget Productivity (e.g., based on FRS (Financial Reporting System) Data), and Rolling Eight Weeks Average (e.g., based on recent historical trends). A user can provide input to override productivity numbers, for example, by entering updated values under an "Overrides" column, if the productivity numbers are inflated/deflated.

As shown in FIG. 8D, for example, a portion of the shipping plan creation user interface for providing information about a Store Door Configuration can be presented to the user. For example, the Store Door Configuration information can include door assignments for a warehouse environment. If a re-map or re-alignment occurs, for example, an operation manager can update the list.

Referring again to FIG. 8A, for example, a user can create a shipping plan, possibly after providing configuration information (e.g., using one or more of the interfaces shown in FIGS. 8B, 8C, and 8D). A user can first select the "Outbound Volume" control to provide outbound volume information. After providing the outbound volume information, for example, the user can select the "Outbound Planning" control to input staffing for a shift, based on available work volume. After inputting the staffing, for example, the user can select the "Generate Door Volume" control to perform a shipping process simulation, and to view store to door volumes resulting from the simulation. After confirming the simulation results, for example, the user can select the "Upload Plan" control to upload and store the shipping plan with the associated inputs used to perform the simulation of the plan.

In some implementations, input recommendations may be provided by a plan creation user interface. For example, the computing server(s) 160 can use various machine learning techniques to determine an optimal input value for a particular input (or group of inputs, such as sequencing controls), and can provide the optimal input value as a recommended value (e.g., a default value provided within or in proximity to an input control). A user can choose to accept the recommended value as an input value, or can provide another input value, for example. Input recommendations may be provide for any, all, or none of the input controls presented on the various plan creation user interfaces, for example.

The various example user interfaces and/or interface flow depicted in FIGS. 6-8 can be applied to configuration settings and process planning for various warehouse processes (e.g., receiving, storage and retrieval, sortation, shipping), however other interfaces may be provided in other examples. In general, the depicted plan creation user interfaces and other possible plan creation user interfaces can be used to facilitate the process flow shown in FIGS. 5A-B.

Figure 9:
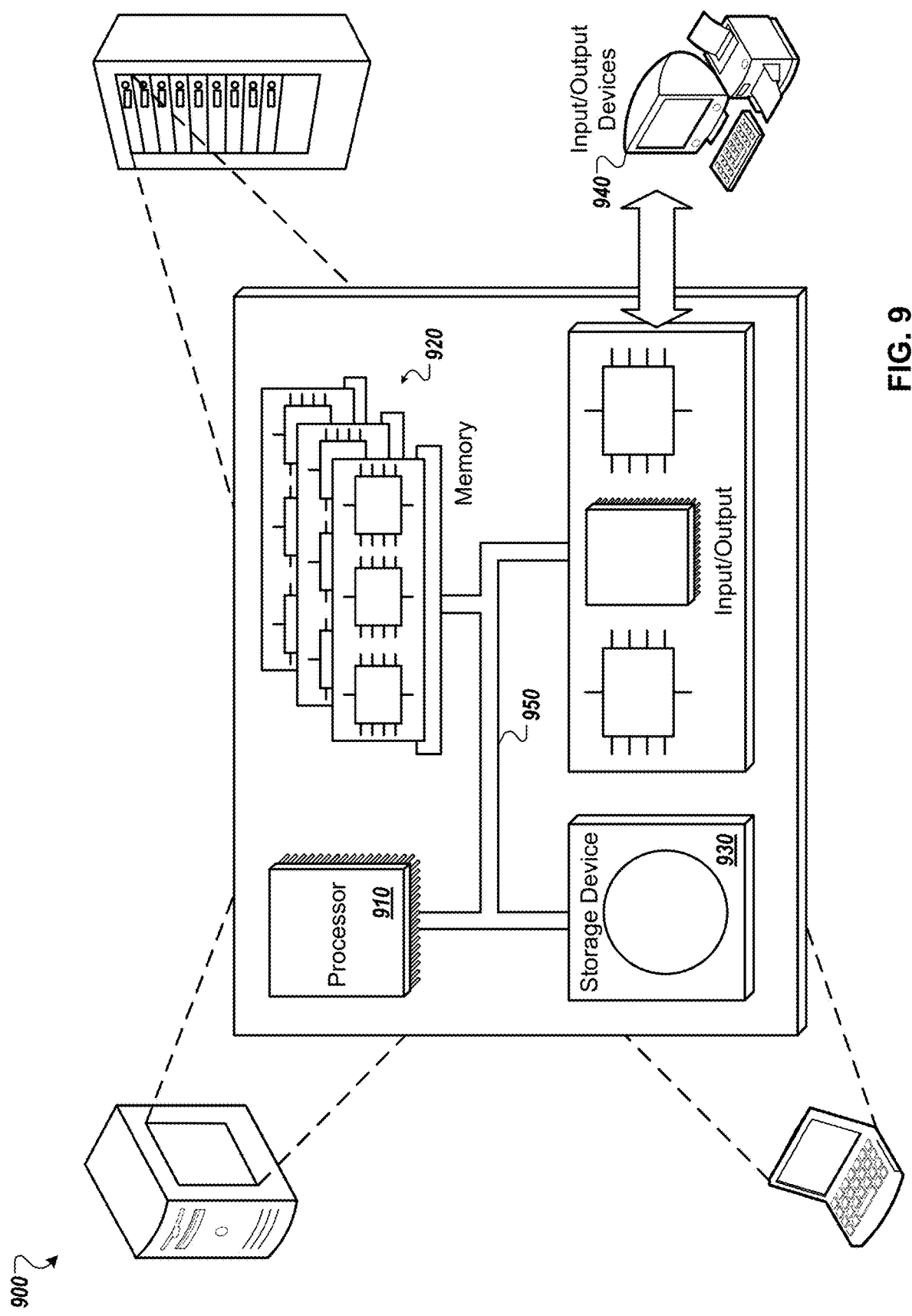
FIG. 9 is a schematic diagram that shows an example of a computing system.

FIG. 9 is a schematic diagram that shows an example of a computing system 900. The computing system 900 can be used for some or all of the operations described previously, according to some implementations. The computing system 900 includes a processor 910, a memory 920, a storage device 930, and an input/output device 940. Each of the processor 910, the memory 920, the storage device 930, and the input/output device 940 are interconnected using a system bus 950. The processor 910 is capable of processing instructions for execution within the computing system 900. In some implementations, the processor 910 is a single-threaded processor. In some implementations, the processor 910 is a multi-threaded processor. The processor 910 is capable of processing instructions stored in the memory 920 or on the storage device 930 to display graphical information for a user interface on the input/output device 940.

The memory 920 stores information within the computing system 900. In some implementations, the memory 920 is a computer-readable medium. In some implementations, the memory 920 is a volatile memory unit. In some implementations, the memory 920 is a non-volatile memory unit.

The storage device 930 is capable of providing mass storage for the computing system 900. In some implementations, the storage device 930 is a computer-readable medium. In various different implementations, the storage device 930 may be a floppy disk device, a hard disk device, an optical disk device, or a tape device.

The input/output device 940 provides input/output operations for the computing system 900. In some implementations, the input/output device 940 includes a keyboard and/or pointing device. In some implementations, the input/output device 940 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

What is claimed is:

1. A computer-implemented method comprising:
providing, by a warehouse coordination system and to a first computing device, data for presentation by a first plan creation user interface for a first warehouse process;
receiving, by the warehouse coordination system and through a sequencing portion of the first plan creation user interface presented by the first computing device, user input that indicates a sequence of tasks to be performed over a shift for the first warehouse process;
after receiving the user input that indicates the sequence of tasks to be performed over the shift for the first warehouse process, receiving, by the warehouse coordination system and through a resource allocation portion of the first plan creation user interface presented by the first computing device, user input that indicates resources to be applied to the tasks to be performed over the shift for the first warehouse process;
after receiving the user input that indicates resources to be applied to the tasks to be performed over the shift for the first warehouse process, receiving, by the warehouse coordination system and through the first plan creation user interface, a simulation command to perform a simulation of the tasks to be performed over the shift for the first warehouse process;
in response to receiving the simulation command, performing, by the warehouse coordination system, the simulation of the tasks to be performed over the shift for the first warehouse process, according to the user input that indicates the sequence of tasks to be performed and the user input that indicates the resources to be applied to the tasks;
providing, by the warehouse coordination system, simulation output data based on the simulation of the tasks to be performed for the first warehouse process, for presentation by a simulation output portion of the first plan creation user interface, by the first computing device;
receiving, by the warehouse coordination system and through the first plan creation user interface, a confirmation command to confirm the simulation output data; and
in response to receiving the confirmation command, (i) storing, by the warehouse coordination system, the user input that indicates the sequence of tasks to be performed over the shift for the first warehouse process, the user input that indicates the resources to be applied to the tasks, and the simulation output data based on the simulation of the tasks to be performed, and (ii) providing, by the warehouse coordination system and to a second computing device, at least a portion of the simulation output data for use by a second plan creation interface for a second warehouse process that is downstream from the first warehouse process, the portion of the simulation output data including a list of tasks that are available to be performed over the shift for the second warehouse process.

2. The computer-implemented method of claim 1, further comprising:
receiving, by the warehouse coordination system and through a configuration portion of the plan creation user interface, user input that indicates a configuration of a warehouse environment in which the first warehouse process and the second warehouse process are to be performed; and
in response to receiving the simulation command, performing, by the warehouse coordination system, the simulation of the tasks to be performed over the shift for the first warehouse process, according to the user input that indicates the configuration of the warehouse environment.

3. The computer-implemented method of claim 1, wherein the sequencing portion of the plan creation user interface includes a list of tasks that are available to be performed over the shift for the first warehouse process, and one or more controls for selecting and sequencing the tasks.

4. The computer-implemented method of claim 1, wherein the resource allocation portion of the plan creation user interface includes, for each of multiple periods of the shift for the first warehouse process, one or more controls for indicating a number of workers to be staffed during the period.

5. The computer-implemented method of claim 1, wherein a user of the first plan creation user interface for the first warehouse process is different from a user of the second plan creation for the second warehouse process.

6. The computer-implemented method of claim 1, wherein the warehouse coordination system provides simulation output data based on a simulation of tasks to be performed over the shift for a receiving process, for use by a storage plan creation user interface for a storage process.

7. The computer-implemented method of claim 1, wherein the warehouse coordination system provides simulation output data based on a simulation of tasks to be performed over the shift for a retrieval process, for use by a sortation plan creation user interface for a sortation process, or for use by a shipping plan creation user interface for a shipping process.

8. The computer-implemented method of claim 1, wherein the warehouse coordination system provides simulation output data based on a simulation of tasks to be performed over the shift for a sortation process, for use by a shipping plan creation user interface for a shipping process.

9. A computer system comprising:
one or more data processing apparatuses including one or more processors, memory, and storage devices storing instructions that, when executed, cause the one or more processors to perform operations comprising:

providing, by a warehouse coordination system and to a first computing device, data for presentation by a first plan creation user interface for a first warehouse process;

receiving, by the warehouse coordination system and through a sequencing portion of the first plan creation user interface presented by the first computing device, user input that indicates a sequence of tasks to be performed over a shift for the first warehouse process;

after receiving the user input that indicates the sequence of tasks to be performed over the shift for the first warehouse process, receiving, by the warehouse coordination system and through a resource allocation portion of the first plan creation user interface presented by the first computing device, user input that indicates resources to be applied to the tasks to be performed over the shift for the first warehouse process;

after receiving the user input that indicates resources to be applied to the tasks to be performed over the shift for the first warehouse process, receiving, by the warehouse coordination system and through the first plan creation user interface, a simulation command to perform a simulation of the tasks to be performed over the shift for the first warehouse process;

in response to receiving the simulation command, performing, by the warehouse coordination system, the simulation of the tasks to be performed over the shift for the first warehouse process, according to the user input that indicates the sequence of tasks to be performed and the user input that indicates the resources to be applied to the tasks;

providing, by the warehouse coordination system, simulation output data based on the simulation of the tasks to be performed for the first warehouse process, for presentation by a simulation output portion of the first plan creation user interface, by the first computing device;

receiving, by the warehouse coordination system and through the first plan creation user interface, a confirmation command to confirm the simulation output data; and in response to receiving the confirmation command, storing, by the warehouse coordination system, the user input that indicates the sequence of tasks to be performed over the shift for the first warehouse process, the user input that indicates the resources to be applied to the tasks, and the simulation output data based on the simulation of the tasks to be performed, and (ii) providing, by the warehouse coordination system and to a second computing device, at least a portion of the simulation output data for use by a second plan creation interface for a second warehouse process that is downstream from the first warehouse process, the portion of the simulation output data including a list of tasks that are available to be performed over the shift for the second warehouse process.

10. The computer system of claim 9, the operations further comprising:

receiving, by the warehouse coordination system and through a configuration portion of the plan creation user interface, user input that indicates a configuration of a warehouse environment in which the first warehouse process and the second warehouse process are to be performed; and in response to receiving the simulation command, performing, by the warehouse coordination system, the simulation of the tasks to be performed over the shift for the first warehouse process, according to the user input that indicates the configuration of the warehouse environment.

11. The computer system of claim 9, wherein the sequencing portion of the plan creation user interface includes a list of tasks that are available to be performed over the shift for the first warehouse process, and one or more controls for selecting and sequencing the tasks.

12. The computer system of claim 9, wherein the resource allocation portion of the plan creation user interface includes, for each of multiple periods of the shift for the first warehouse process, one or more controls for indicating a number of workers to be staffed during the period.

13. The computer system of claim 9, the wherein a user of the first plan creation user interface for the first warehouse process is different from a user of the second plan creation for the second warehouse process.

14. The computer system of claim 9, wherein the warehouse coordination system provides simulation output data based on a simulation of tasks to be performed over the shift for a receiving process, for use by a storage plan creation user interface for a storage process.

15. The computer system of claim 9, wherein the warehouse coordination system provides simulation output data based on a simulation of tasks to be performed over the shift for a retrieval process, for use by a sortation plan creation user interface for a sortation process, or for use by a shipping plan creation user interface for a shipping process.

16. The computer system of claim 13, wherein the warehouse coordination system provides simulation output data based on a simulation of tasks to be performed over the shift for a sortation process, for use by a shipping plan creation user interface for a shipping process.

17. A non-transitory computer-readable storage medium coupled to one or more processors and having instructions stored thereon which, when executed by the one or more processors, cause the one or more processors to perform operations comprising:

providing, by a warehouse coordination system and to a first computing device, data for presentation by a first plan creation user interface for a first warehouse process;

receiving, by the warehouse coordination system and through a sequencing portion of the first plan creation user interface presented by the first computing device, user input that indicates a sequence of tasks to be performed over a shift for the first warehouse process;

after receiving the user input that indicates the sequence of tasks to be performed over the shift for the first warehouse process, receiving, by the warehouse coordination system and through a resource allocation portion of the first plan creation user interface presented by the first computing device, user input that indicates resources to be applied to the tasks to be performed over the shift for the first warehouse process;

after receiving the user input that indicates resources to be applied to the tasks to be performed over the shift for the first warehouse process, receiving, by the warehouse coordination system and through the first plan creation user interface, a simulation command to perform a simulation of the tasks to be performed over the shift for the first warehouse process;

in response to receiving the simulation command, performing, by the warehouse coordination system, the simulation of the tasks to be performed over the shift for the first warehouse process, according to the user input that indicates the sequence of tasks to be performed and the user input that indicates the resources to be applied to the tasks;

providing, by the warehouse coordination system, simulation output data based on the simulation of the tasks to be performed for the first warehouse process, for presentation by a simulation output portion of the first plan creation user interface, by the first computing device;

receiving, by the warehouse coordination system and through the first plan creation user interface, a confirmation command to confirm the simulation output data; and in response to receiving the confirmation command, storing, by the warehouse coordination system, the user input that indicates the sequence of tasks to be performed over the shift for the first warehouse process, the user input that indicates the resources to be applied to the tasks, and the simulation output data based on the simulation of the tasks to be performed, and (ii) providing, by the warehouse coordination system and to a second computing device, at least a portion of the simulation output data for use by a second plan creation interface for a second warehouse process that is downstream from the first warehouse process, the portion of the simulation output data including a list of tasks that are available to be performed over the shift for the second warehouse process.

18. The non-transitory computer-readable storage medium of claim 17, the operations further comprising:
receiving, by the warehouse coordination system and through a configuration portion of the plan creation user interface, user input that indicates a configuration of a warehouse environment in which the first warehouse process and the second warehouse process are to be performed; and in response to receiving the simulation command, performing, by the warehouse coordination system, the simulation of the tasks to be performed over the shift for the first warehouse process, according to the user input that indicates the configuration of the warehouse environment.

19. The non-transitory computer-readable storage medium of claim 17,
wherein a user of the first plan creation user interface for the first warehouse process is different from a user of the second plan creation for the second warehouse process.

* * * * *